US010256950B2

(12) United States Patent
Yang et al.

(10) Patent No.: US 10,256,950 B2
(45) Date of Patent: Apr. 9, 2019

(54) INTERFERENCE CANCELATION FEEDBACK METHOD, RELATED APPARATUS, AND SYSTEM

(71) Applicant: HUAWEI TECHNOLOGIES CO., LTD., Shenzhen (CN)

(72) Inventors: Yi Yang, Shanghai (CN); Meng Hua, Shanghai (CN); Xiaolei Tie, Shanghai (CN)

(73) Assignee: HUAWEI TECHNOLOGIES CO., LTD., SHENZHEN (CN)

( * ) Notice: Subject to any disclaimer, the term of this patent is extended or adjusted under 35 U.S.C. 154(b) by 0 days.

(21) Appl. No.: 15/178,005

(22) Filed: Jun. 9, 2016

(65) Prior Publication Data
US 2016/0295455 A1 Oct. 6, 2016

Related U.S. Application Data

(63) Continuation of application No. PCT/CN2014/092050, filed on Nov. 24, 2014.

(30) Foreign Application Priority Data

Dec. 13, 2013 (CN) .......................... 2013 1 0688188

(51) Int. Cl.
H04L 5/00 (2006.01)
H04J 11/00 (2006.01)
(Continued)

(52) U.S. Cl.
CPC .......... *H04L 5/0032* (2013.01); *H04J 11/005* (2013.01); *H04L 1/0026* (2013.01); *H04L 1/1671* (2013.01); *H04W 28/04* (2013.01)

(58) Field of Classification Search
CPC ........ H04J 11/005; H04L 1/00; H04L 5/0032; H04L 1/0026; H04L 1/1671; H04W 28/048
(Continued)

(56) References Cited

U.S. PATENT DOCUMENTS

2007/0149242 A1* 6/2007 Kim ....................... H04J 11/004
455/525
2008/0013610 A1* 1/2008 Varadarajan ......... H04B 7/0417
375/221
(Continued)

FOREIGN PATENT DOCUMENTS

CN 101442389 5/2009
CN 101478825 7/2009
(Continued)

OTHER PUBLICATIONS

International Search Report dated Feb. 4, 2015 in corresponding International Application No. PCT/CN2014/092050.
(Continued)

*Primary Examiner* — Eugene Yun
(74) *Attorney, Agent, or Firm* — Staas & Halsey LLP

(57) ABSTRACT

An interference cancelation feedback method is provided. A channel quality indicator CQI of a serving cell is generated according to a received signal, where the received signal includes a serving cell signal and an interference cell signal, where an interference cell interferes with the serving cell of user equipment; interference cancelation indication information is generated, where the interference cancelation indication information is used to indicate a situation of interference cancelation performed on the received signal by the user equipment; the channel quality indicator CQI of the serving cell is fed back to a network side; and the interference cancelation indication information is fed back to the network side, where the interference cancelation indication
(Continued)

information and the channel quality indicator CQI of the serving cell are used by the network side to schedule the user equipment.

21 Claims, 13 Drawing Sheets

(51) Int. Cl.
  *H04W 28/04* (2009.01)
  *H04L 1/00* (2006.01)
  *H04L 1/16* (2006.01)
(58) Field of Classification Search
  USPC .......................................................... 455/63.1
  See application file for complete search history.

(56) References Cited

U.S. PATENT DOCUMENTS

| | | |
|---|---|---|
| 2009/0201871 A1 | 8/2009 | Sambhwani et al. |
| 2011/0002371 A1 | 1/2011 | Forenza et al. |
| 2013/0231159 A1* | 9/2013 | Roxbergh ............. H04L 1/1692 455/561 |
| 2014/0169304 A1 | 6/2014 | DiGirolamo et al. |

FOREIGN PATENT DOCUMENTS

| | | |
|---|---|---|
| EP | 2 237 460 A1 | 10/2010 |
| KR | 10-2009-0082427 | 7/2009 |
| KR | 10-2010-0117669 | 11/2010 |
| WO | WO2014004897 | 1/2014 |

OTHER PUBLICATIONS

International Search Report, dated Feb. 4, 2015, in International Application No. PCT/CN2014/092050 (13 pp.).
Extended European Search Report, dated Oct. 18, 2016, in European Application No. 14869255.1 (9 pp.).
*Considerations on NAIC in HetNet*, 3GPP TSG-RAN WG1 Meeting #74, R1-132949, Barcelona, Spain, Aug. 19-23, 2013, (2 pp.).
Chinese Office Action dated Nov. 3, 2017 in corresponding Chinese Patent Application No. 201310688188.9, 7 pages.
Extended European Search Report dated Jun. 28, 2018, in corresponding European Patent Application No. 17197950.3, 10 pgs.

* cited by examiner

INTERFERENCE CANCELATION FEEDBACK METHOD, RELATED APPARATUS, AND SYSTEM

CROSS-REFERENCE TO RELATED APPLICATIONS

This application is a continuation of International Application No. PCT/CN2014/092050, filed on Nov. 24, 2014, which claims priority to Chinese Patent Application No. 201310688188.9, filed on Dec. 13, 2013, both of which are hereby incorporated by reference in their entireties.

TECHNICAL FIELD

Embodiments of the present invention relate to the communications field, and in particular, to an interference cancelation feedback method, a related apparatus, and a system.

BACKGROUND

With the development of radio services, people have a higher requirement on a capacity of a wireless communications system. How to reduce signal interference between different cells (base stations) and between different user equipments is one of keys to further improving the capacity of the wireless communications system. To better resolve user interference between different cells, in research and development of a wireless communications system, people propose and implement a variety of technologies that include network assisted-interference cancelation (Network Assisted-Interference Cancelation, NAIC), where an interference cell signal is reconstructed by using a receiver on a user equipment (User Equipment, UE) side, and then the reconstructed interference cell signal is subtracted from a received signal, so as to cancel inter-cell interference and improve an interference cancelation gain. An interference cell is a cell interfering with a serving cell of UE. A serving cell is a cell in which UE receives a signal by using the serving cell when a service is provided to the UE. For a measurement method and a determining standard for an interference cell, reference may be made to a description of the prior art, and details are not described herein.

If a receiver on a UE side is a post-decoding interference cancelation (post-decoding IC) receiver, when the UE side performs signal reconstruction and cancelation after interference cell code block decoding, it happens that the interference cell code block is incorrectly decoded. That is, a channel quality indicator (Channel Quality Indicator, CQI) of a serving cell fed back by the UE side to a network side fluctuates, but the network side does not know whether a change in the CQI is caused by a change in channel quality or a result (correct or incorrect) of the interference cell code block decoding, thereby causing low efficiency of a scheduler on the network side. If the receiver on the UE side is a pre-decoding interference cancelation (pre-decoding IC) receiver, although the UE side does not perform interference cell code block decoding, the problem of CQI fluctuation after interference cancelation still occurs. Therefore, the network side schedules UE with low efficiency, and the interference cancelation gain cannot be fully used.

SUMMARY

A technical problem to be resolved by embodiments of the present invention is to provide an interference cancelation feedback method, a related apparatus, and a system, which can assist a network side in scheduling UE more efficiently, and make full use of an interference cancelation gain.

According to a first aspect, an embodiment of the present invention provides an interference cancelation feedback method, including:

generating a channel quality indicator CQI of a serving cell according to a received signal, where the received signal includes a serving cell signal and an interference cell signal, where an interference cell interferes with the serving cell of user equipment;

generating interference cancelation indication information, where the interference cancelation indication information is used to indicate a situation of interference cancelation performed on the received signal by the user equipment;

feeding back the channel quality indicator CQI of the serving cell to a network side; and feeding back the interference cancelation indication information to the network side, where the interference cancelation indication information and the channel quality indicator CQI of the serving cell are used by the network side to schedule the user equipment.

With reference to the first aspect, in a first possible implementation manner, the method further includes:

decoding the interference cell signal to obtain a decoding result; and the generating a channel quality indicator CQI of a serving cell according to a received signal includes:

when the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate that the user equipment already completes interference cancelation on the received signal.

With reference to the first aspect or the first possible implementation manner of the first aspect, in a second possible implementation manner, the method further includes:

decoding the interference cell signal to obtain a decoding result; and the generating a channel quality indicator CQI of a serving cell according to a received signal includes:

when the decoding result is incorrect, determining to skip the operation of canceling a reconstructed signal of the interference cell signal from the received signal, and using a channel quality indicator CQI generated without performing interference cancelation as the channel quality indicator CQI of the serving cell, where the interference cancelation indication information is used to indicate that the user equipment does not perform interference cancelation on the received signal.

With reference to the first aspect, in a third possible implementation manner, the method further includes:

decoding the interference cell signal to obtain a decoding result; and the generating a channel quality indicator CQI of a serving cell according to a received signal includes:

regardless of whether the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate whether the decoding result generated before interference cancelation is performed is correct.

With reference to the first aspect, in a fourth possible implementation manner, the generating a channel quality indicator CQI of a serving cell according to a received signal includes:

determining to cancel a reconstructed signal of the interference cell signal from the received signal; and if a channel quality indicator CQI generated after interference cell cancelation is greater than a channel quality indicator CQI generated without performing interference cancelation, using the channel quality indicator CQI generated after interference cell cancelation as the channel quality indicator CQI of the serving cell, where the interference cancelation indication information is used to indicate that the user equipment already completes interference cancelation on the received signal; or if a channel quality indicator CQI generated after interference cell cancelation is less than a channel quality indicator CQI generated without performing interference cancelation, using the channel quality indicator CQI generated without performing interference cancelation as the channel quality indicator CQI of the serving cell, where the interference cancelation indication information is used to indicate that the user equipment does not perform interference cancelation on the received signal.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the feeding back the interference cancelation indication information to the network side includes:

encoding the interference cancelation indication information to obtain first encoding information, encoding a decoding result of decoding the serving cell to obtain second encoding information, and conjoining the first encoding information and the second encoding information to obtain conjoined information; and feeding back the conjoined information to the network side by using a high speed dedicated physical control channel.

With reference to the fifth possible implementation manner of the first aspect, in a sixth possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the encoding the interference cancelation indication information to obtain first encoding information includes: jointly encoding the at least two pieces of interference cancelation indication information to obtain the first encoding information.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the feeding back the interference cancelation indication information to the network side includes:

when feeding back the channel quality indicator CQI of the serving cell to the network side, feeding back the interference cancelation indication information to the network side.

According to a second aspect, an embodiment of the present invention provides a user equipment scheduling method, including:

receiving interference cancelation indication information sent by user equipment, where the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment;

receiving a channel quality indicator CQI of the serving cell sent by the user equipment; and scheduling the user equipment according to the interference cancelation indication information and the channel quality indicator CQI of the serving cell.

With reference to the second aspect, in a first possible implementation manner, the interference cancelation indication information is used to indicate that the user equipment already completes interference cancelation on the received signal, and the channel quality indicator CQI of the serving cell is a channel quality indicator CQI generated after the user equipment performs interference cancelation on the received signal.

With reference to the first possible implementation manner of the second aspect, in a second possible implementation manner, the interference cancelation indication information is used to indicate that the user equipment already completes interference cancelation on the received signal after the interference cell signal is decoded correctly.

With reference to the second aspect, in a third possible implementation manner, the interference cancelation indication information is used to indicate that the user equipment does not perform interference cancelation on the received signal, and the channel quality indicator CQI of the serving cell is a channel quality indicator CQI generated without performing interference cancelation.

With reference to the third possible implementation manner of the second aspect, in a fourth possible implementation manner, the interference cancelation indication information is used to indicate that the user equipment does not perform interference cancelation on the received signal after the interference cell signal is decoded incorrectly.

With reference to the second aspect, in a fifth possible implementation manner, the interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

With reference to the second possible implementation manner of the second aspect, the fourth possible implementation manner of the second aspect, or the fifth possible implementation manner of the second aspect, in a sixth possible implementation manner, the scheduling the user equipment according to the interference cancelation indication information and the channel quality indicator CQI of the serving cell includes:

collecting, according to the decoding result of the interference cell from the user equipment, statistics on a correctness probability of decoding the interference cell fed back by the user equipment; performing, according to the correctness probability obtained by statistics collection, weighted averaging on the channel quality indicator CQI generated after interference cell cancelation and a channel quality indicator CQI generated without performing interference cell cancelation on the received signal; and scheduling the user equipment by using a channel quality indicator CQI generated after the weighted averaging; or collecting, according to the decoding result of the interference cell from the user equipment, statistics on a correctness probability of decoding the interference cell performed by the user equipment; performing, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed; and scheduling the user equipment by using a channel quality indicator CQI generated after the weighted averaging.

With reference to the second aspect, the first possible implementation manner of the second aspect, the second possible implementation manner of the second aspect, the third possible implementation manner of the second aspect, or the fourth possible implementation manner of the second aspect, in a seventh possible implementation manner, the scheduling the user equipment according to the interference cancelation indication information and the channel quality indicator CQI of the serving cell includes:

collecting, according to the interference cancelation indication information, statistics on a probability of the channel quality indicator CQI that is generated after interference cell cancelation and that is fed back by the user equipment;

performing, according to the probability obtained by statistics collection, weighted averaging on the channel quality indicator CQI generated after interference cell cancelation and the channel quality indicator CQI generated without performing interference cell cancelation; and scheduling the user equipment by using a channel quality indicator CQI generated after the weighted averaging.

With reference to the second possible implementation manner of the second aspect, the fourth possible implementation manner of the second aspect, or the fifth possible implementation manner of the second aspect, in an eighth possible implementation manner, the scheduling the user equipment according to the interference cancelation indication information and the channel quality indicator CQI of the serving cell includes:

collecting, according to the decoding result of the interference cell from the user equipment, statistics on average transport block size information when the interference cell of the user equipment can be decoded correctly within a preset period of time;

confirming an interference cancelation capability of the user equipment by using the average transport block size information obtained by statistics collection, so as to adjust the channel quality indicator CQI of the serving cell; and scheduling the user equipment by using the adjusted channel quality indicator CQI.

With reference to the eighth possible implementation manner of the second aspect, in a ninth possible implementation manner, the confirming an interference cancelation capability of the user equipment by using the average transport block size information obtained by statistics collection, so as to adjust the channel quality indicator CQI of the serving cell includes:

determining whether a size of a transport block to be scheduled by the interference cell in a next frame is greater than the average transport block size; and when a determining result is yes, reducing the channel quality indicator CQI of the serving cell; or when a determining result is no, increasing the channel quality indicator CQI of the serving cell.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, or the ninth possible implementation manner of the second aspect, in a tenth possible implementation manner, the receiving interference cancelation indication information sent by user equipment includes:

receiving, by using a high speed dedicated physical control channel, information obtained by conjoining first encoding information and second encoding information, where the first encoding information is encoding information of the interference cancelation indication information, and the second encoding information is obtained by encoding a decoding result of decoding the serving cell.

With reference to the tenth possible implementation manner of the second aspect, in an eleventh possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the second encoding information is obtained by jointly encoding the at least two pieces of interference cancelation indication information.

According to a third aspect, an embodiment of the present invention provides an interference cancelation feedback apparatus, including:

a channel quality indicator generation module, configured to generate a channel quality indicator CQI of a serving cell according to a received signal, where the received signal includes a serving cell signal and an interference cell signal, where an interference cell interferes with the serving cell of user equipment;

an interference cancelation indication generation module, configured to generate interference cancelation indication information, where the interference cancelation indication information is used to indicate a situation of interference cancelation performed on the received signal by the user equipment;

a channel quality indicator feedback module, configured to feed back the channel quality indicator CQI of the serving cell to a network side; and an interference cancelation indication feedback module, configured to feed back the interference cancelation indication information to the network side, where the interference cancelation indication information and the channel quality indicator CQI of the serving cell are used by the network side to schedule the user equipment.

With reference to the third aspect, in a first possible implementation manner, the apparatus further includes:

a first decoding module, configured to decode the interference cell signal to obtain a decoding result; and the channel quality indicator generation module includes:

a first determining unit, configured to: when the decoding result of the first decoding module is correct, determine to cancel a reconstructed signal of the interference cell signal from the received signal, and use a channel quality indicator CQI generated after interference cancelation as the channel quality indicator CQI of the serving cell, where the interference cancelation indication information generated by the interference cancelation indication generation module is used to indicate that the user equipment already completes interference cancelation on the received signal.

With reference to the third aspect or the first possible implementation manner of the third aspect, in a second possible implementation manner, the apparatus further includes:

a second decoding module, configured to decode the interference cell signal to obtain a decoding result; and the channel quality indicator generation module includes:

a second determining unit, configured to: when the decoding result of the second decoding module is incorrect, determine to skip the operation of canceling a reconstructed signal of the interference cell signal from the received signal, and use a channel quality indicator CQI generated without performing interference cancelation as the channel quality indicator CQI of the serving cell, where the interference cancelation indication information generated by the interference cancelation indication generation module is used to indicate that the user equipment does not perform interference cancelation on the received signal.

With reference to the third aspect, in a third possible implementation manner, the apparatus further includes:

a third decoding module, configured to decode the interference cell signal to obtain a decoding result; and the channel quality indicator generation module includes:

a third determining unit, configured to: regardless of whether the decoding result of the third decoding module is correct, determine to cancel a reconstructed signal of the interference cell signal from the received signal, and use a channel quality indicator CQI generated after interference cancelation as the channel quality indicator CQI of the serving cell, where the interference cancelation indication information generated by the interference cancelation indication generation module is used to indicate whether the decoding result generated before interference cancelation is performed is correct.

With reference to the third aspect, in a fourth possible implementation manner, the channel quality indicator generation module includes:

a fourth determining unit, configured to determine to cancel a reconstructed signal of the interference cell signal from the received signal;

a first channel quality indicator unit, configured to: if a channel quality indicator CQI generated after interference cell cancelation is greater than a channel quality indicator CQI generated without performing interference cancelation, use the channel quality indicator CQI generated after interference cell cancelation as the channel quality indicator CQI of the serving cell, where the interference cancelation indication information generated by the interference cancelation indication generation module is used to indicate that the user equipment already completes interference cancelation on the received signal; and a second channel quality indicator unit, configured to: if the channel quality indicator CQI generated after interference cell cancelation is less than the channel quality indicator CQI generated without performing interference cancelation, use the channel quality indicator CQI generated without performing interference cancelation as the channel quality indicator CQI of the serving cell, where the interference cancelation indication information generated by the interference cancelation indication generation module is used to indicate that the user equipment does not perform interference cancelation on the received signal.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the interference cancelation indication feedback module includes:

an encoding and conjoining unit, configured to encode the interference cancelation indication information to obtain first encoding information, encode a decoding result of decoding the serving cell to obtain second encoding information, and conjoin the first encoding information and the second encoding information to obtain conjoined information; and an information feedback unit, configured to feed back the conjoined information to the network side by using a high speed dedicated physical control channel.

With reference to the fifth possible implementation manner of the third aspect, in a sixth possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the encoding, by the encoding and conjoining unit, the interference cancelation indication information to obtain the first encoding information specifically includes: jointly encoding the at least two pieces of interference cancelation indication information to obtain the first encoding information.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner, when feeding back the channel quality indicator CQI of the serving cell to the network side, the channel quality indicator feedback module feeds back the interference cancelation indication information to the network side.

According to a fourth aspect, an embodiment of the present invention provides a user equipment scheduling apparatus, including:

an interference cancelation indication receiver module, configured to receive interference cancelation indication information sent by user equipment, where the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment;

a channel quality indicator receiving module, configured to receive a channel quality indicator CQI of the serving cell sent by the user equipment; and a scheduling module, configured to schedule the user equipment according to the interference cancelation indication information and the channel quality indicator CQI of the serving cell.

With reference to the fourth aspect, in a first possible implementation manner, the interference cancelation indication information is used to indicate that the user equipment already completes interference cancelation on the received signal, and the channel quality indicator CQI of the serving cell is a channel quality indicator CQI generated after the user equipment performs interference cancelation on the received signal.

With reference to the first possible implementation manner of the fourth aspect, in a second possible implementation manner, the interference cancelation indication information is used to indicate that the user equipment already completes interference cancelation on the received signal after the interference cell signal is decoded correctly.

With reference to the fourth aspect, in a third possible implementation manner, the interference cancelation indication information is used to indicate that the user equipment does not perform interference cancelation on the received signal, and the channel quality indicator CQI of the serving cell is a channel quality indicator CQI generated without performing interference cancelation.

With reference to the third possible implementation manner of the fourth aspect, in a fourth possible implementation manner, the interference cancelation indication information is used to indicate that the user equipment does not perform interference cancelation on the received signal after the interference cell signal is decoded incorrectly.

With reference to the fourth aspect, in a fifth possible implementation manner, the interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

With reference to the second possible implementation manner of the fourth aspect, the fourth possible implementation manner of the fourth aspect, or the fifth possible implementation manner of the fourth aspect, in a sixth possible implementation manner, the scheduling module includes:

a first statistics collection unit, configured to collect, according to the decoding result of the interference cell from the user equipment, statistics on a correctness probability of decoding the interference cell fed back by the user equipment; a first weighted averaging unit, configured to perform, according to the correctness probability obtained by statistics collection, weighted averaging on the channel quality indicator CQI generated after interference cell cancelation and a channel quality indicator CQI generated without performing interference cell cancelation on the received signal; and a first scheduling unit, configured to schedule the user equipment by using a channel quality indicator CQI generated after the weighted averaging; or a second statistics collection unit, configured to collect, according to the decoding result of the interference cell from the user equipment, statistics on a correctness probability of decoding the interference cell performed by the user equipment; a second weighted averaging unit, configured to perform, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed; and a second scheduling unit, configured to schedule the user equipment by using a channel quality indicator CQI generated after the weighted averaging.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a seventh possible implementation manner, the scheduling module includes:

a third statistics collection unit, configured to collect, according to the interference cancelation indication information, statistics on a probability of the channel quality indicator CQI that is generated after interference cell cancelation and that is fed back by the user equipment;

a third weighted averaging unit, configured to perform, according to the probability obtained by statistics collection, weighted averaging on the channel quality indicator CQI generated after interference cell cancelation and the channel quality indicator CQI generated without performing interference cell cancelation; and a third scheduling unit, configured to schedule the user equipment by using a channel quality indicator CQI generated after the weighted averaging.

With reference to the second possible implementation manner of the fourth aspect, the fourth possible implementation manner of the fourth aspect, or the fifth possible implementation manner of the fourth aspect, in an eighth possible implementation manner, the scheduling module includes:

a fourth statistics collection unit, configured to collect, according to the decoding result of the interference cell from the user equipment, statistics on average transport block size information when the interference cell of the user equipment can be decoded correctly within a preset period of time;

a confirmation and adjustment unit, configured to confirm an interference cancelation capability of the user equipment by using the average transport block size information obtained by statistics collection, so as to adjust the channel quality indicator CQI of the serving cell; and a fourth scheduling unit, configured to schedule the user equipment by using the adjusted channel quality indicator CQI.

With reference to the eighth possible implementation manner of the fourth aspect, in a ninth possible implementation manner, the confirmation and adjustment unit includes:

a judging unit, configured to determine whether a size of a transport block to be scheduled by the interference cell in a next frame is greater than the average transport block size; and a determining processing unit, configured to: when a determining result is yes, reduce the channel quality indicator CQI of the serving cell; or when a determining result is no, increase the channel quality indicator CQI of the serving cell.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, or the ninth possible implementation manner of the fourth aspect, in a tenth possible implementation manner, the interference cancelation indication receiver module is specifically configured to:

receive, by using a high speed dedicated physical control channel, information obtained by conjoining first encoding information and second encoding information, where the first encoding information is encoding information of the interference cancelation indication information, and the second encoding information is obtained by encoding a decoding result of decoding the serving cell.

With reference to the tenth possible implementation manner of the fourth aspect, in an eleventh possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the second encoding information is obtained by jointly encoding the at least two pieces of interference cancelation indication information.

According to a fifth aspect, an embodiment of the present invention provides user equipment, including: an input apparatus, an output apparatus, a memory, and a processor, where the processor performs the following steps:

generating a channel quality indicator CQI of a serving cell according to a received signal, where the received signal includes a serving cell signal and an interference cell signal, where an interference cell interferes with the serving cell of user equipment; generating interference cancelation indication information, where the interference cancelation indication information is used to indicate a situation of interference cancelation performed on the received signal by the user equipment; feeding back the channel quality indicator CQI of the serving cell to a network side; and feeding back the interference cancelation indication information to the network side, where the interference cancelation indication information and the channel quality indicator CQI of the serving cell are used by the network side to schedule the user equipment.

With reference to the fifth aspect, in a first possible implementation manner, the processor further performs: decoding the interference cell signal to obtain a decoding result; and the generating, by the processor, a channel quality indicator CQI of a serving cell according to a received signal includes: when the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate that the user equipment already completes interference cancelation on the received signal.

With reference to the fifth aspect or the first possible implementation manner of the fifth aspect, in a second possible implementation manner, the processor further performs: decoding the interference cell signal to obtain a decoding result; and the generating, by the processor, a channel quality indicator CQI of a serving cell according to a received signal includes: when the decoding result is incorrect, determining to skip the operation of canceling a reconstructed signal of the interference cell signal from the received signal, and using a channel quality indicator CQI generated without performing interference cancelation as the channel quality indicator CQI of the serving cell, where the interference cancelation indication information is used to indicate that the user equipment does not perform interference cancelation on the received signal.

With reference to the fifth aspect, in a third possible implementation manner, the processor further performs: decoding the interference cell signal to obtain a decoding result; and the generating, by the processor, a channel quality indicator CQI of a serving cell according to a received signal includes: regardless of whether the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate whether the decoding result generated before interference cancelation is performed is correct.

With reference to the fifth aspect, in a fourth possible implementation manner, the generating, by the processor, a channel quality indicator CQI of a serving cell according to a received signal includes:

determining to cancel a reconstructed signal of the interference cell signal from the received signal; and if a channel quality indicator CQI generated after interference cell cancelation is greater than a channel quality indicator CQI generated without performing interference cancelation, using the channel quality indicator CQI generated after interference cell cancelation as the channel quality indicator CQI of the serving cell, where the interference cancelation indication information is used to indicate that the user equipment already completes interference cancelation on the received signal; or if a channel quality indicator CQI generated after interference cell cancelation is less than a channel quality indicator CQI generated without performing interference cancelation, using the channel quality indicator CQI generated without performing interference cancelation as the channel quality indicator CQI of the serving cell, where the interference cancelation indication information is used to indicate that the user equipment does not perform interference cancelation on the received signal.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner, the feeding back, by the processor, the interference cancelation indication information to the network side includes:

encoding the interference cancelation indication information to obtain first encoding information, encoding a decoding result of decoding the serving cell to obtain second encoding information, and conjoining the first encoding information and the second encoding information to obtain conjoined information; and feeding back the conjoined information to the network side by using a high speed dedicated physical control channel.

With reference to the fifth possible implementation manner of the fifth aspect, in a sixth possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the encoding, by the processor, the interference cancelation indication information to obtain first encoding information includes: jointly encoding the at least two pieces of interference cancelation indication information to obtain the first encoding information.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, or the sixth possible implementation manner of the fifth aspect, in a seventh possible implementation manner, the feeding back, by the processor, the interference cancelation indication information to the network side includes:

when feeding back the channel quality indicator CQI of the serving cell to the network side, feeding back the interference cancelation indication information to the network side.

According to a sixth aspect, an embodiment of the present invention provides a network device, including: an input apparatus, an output apparatus, a memory, and a processor, where the processor performs the following steps:

receiving interference cancelation indication information sent by user equipment, where the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment; receiving a channel quality indicator CQI of the serving cell sent by the user equipment; and scheduling the user equipment according to the interference cancelation indication information and the channel quality indicator CQI of the serving cell.

With reference to the sixth aspect, in a first possible implementation manner, the interference cancelation indication information is used to indicate that the user equipment already completes interference cancelation on the received signal, and the channel quality indicator CQI of the serving cell is a channel quality indicator CQI generated after the user equipment performs interference cancelation on the received signal.

With reference to the first possible implementation manner of the sixth aspect, in a second possible implementation manner, the interference cancelation indication information is used to indicate that the user equipment already completes interference cancelation on the received signal after the interference cell signal is decoded correctly.

With reference to the sixth aspect, in a third possible implementation manner, the interference cancelation indication information is used to indicate that the user equipment does not perform interference cancelation on the received signal, and the channel quality indicator CQI of the serving cell is a channel quality indicator CQI generated without performing interference cancelation.

With reference to the third possible implementation manner of the sixth aspect, in a fourth possible implementation manner, the interference cancelation indication information is used to indicate that the user equipment does not perform interference cancelation on the received signal after the interference cell signal is decoded incorrectly.

With reference to the sixth aspect, in a fifth possible implementation manner, the interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

With reference to the second possible implementation manner of the sixth aspect, the fourth possible implementation manner of the sixth aspect, or the fifth possible implementation manner of the sixth aspect, in a sixth possible implementation manner, the scheduling, by the processor, the user equipment according to the interference cancelation indication information and the channel quality indicator CQI of the serving cell includes:

collecting, according to the decoding result of the interference cell from the user equipment, statistics on a correctness probability of decoding the interference cell fed back by the user equipment; performing, according to the correctness probability obtained by statistics collection, weighted averaging on the channel quality indicator CQI generated after interference cell cancelation and a channel quality indicator CQI generated without performing interference cell cancelation on the received signal; and scheduling the user equipment by using a channel quality indicator CQI generated after the weighted averaging; or collecting, according to the decoding result of the interference cell from the user equipment, statistics on a correctness probability of decoding the interference cell performed by the user equipment; performing, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed; and scheduling the user equipment by using a channel quality indicator CQI generated after the weighted averaging.

With reference to the sixth aspect, the first possible implementation manner of the sixth aspect, the second possible implementation manner of the sixth aspect, the third possible implementation manner of the sixth aspect, or the fourth possible implementation manner of the sixth aspect, in a seventh possible implementation manner, the scheduling, by the processor, the user equipment according to the interference cancelation indication information and the channel quality indicator CQI of the serving cell includes:

collecting, according to the interference cancelation indication information, statistics on a probability of the channel quality indicator CQI that is generated after interference cell cancelation and that is fed back by the user equipment; performing, according to the probability obtained by statistics collection, weighted averaging on the channel quality indicator CQI generated after interference cell cancelation and the channel quality indicator CQI generated without performing interference cell cancelation; and scheduling the user equipment by using a channel quality indicator CQI generated after the weighted averaging.

With reference to the second possible implementation manner of the sixth aspect, the fourth possible implementation manner of the sixth aspect, or the fifth possible implementation manner of the sixth aspect, in an eighth possible implementation manner, the scheduling, by the processor, the user equipment according to the interference cancelation indication information and the channel quality indicator CQI of the serving cell includes:

collecting, according to the decoding result of the interference cell from the user equipment, statistics on average transport block size information when the interference cell of the user equipment can be decoded correctly within a preset period of time; confirming an interference cancelation capability of the user equipment by using the average transport block size information obtained by statistics collection, so as to adjust the channel quality indicator CQI of the serving cell; and scheduling the user equipment by using the adjusted channel quality indicator CQI.

With reference to the eighth possible implementation manner of the sixth aspect, in a ninth possible implementation manner, the confirming, by the processor, an interference cancelation capability of the user equipment by using the average transport block size information obtained by statistics collection, so as to adjust the channel quality indicator CQI of the serving cell includes:

determining whether a size of a transport block to be scheduled by the interference cell in a next frame is greater than the average transport block size; and when a determining result is yes, reducing the channel quality indicator CQI of the serving cell; or when a determining result is no, increasing the channel quality indicator CQI of the serving cell.

With reference to the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, the seventh possible implementation manner of the sixth aspect, the eighth possible implementation manner of the sixth aspect, or the ninth possible implementation manner of the sixth aspect, in a tenth possible implementation manner, the receiving, by the processor, interference cancelation indication information sent by user equipment includes:

receiving, by using a high speed dedicated physical control channel, information obtained by conjoining first encoding information and second encoding information, where the first encoding information is encoding information of the interference cancelation indication information, and the second encoding information is obtained by encoding a decoding result of decoding the serving cell.

With reference to the tenth possible implementation manner of the sixth aspect, in an eleventh possible implementation manner, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the second encoding information is obtained by jointly encoding the at least two pieces of interference cancelation indication information.

According to a seventh aspect, an embodiment of the present invention provides a user equipment scheduling system, including user equipment and a network device, where the user equipment includes the user equipment in the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect; and the network device includes the network device in the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, the seventh possible implementation manner of the sixth aspect, the eighth possible implementation manner of the sixth aspect, the ninth possible implementation manner of the sixth aspect, the tenth possible implementation manner of the sixth aspect, or the eleventh possible implementation manner of the sixth aspect.

In implementation of the embodiments of the present invention, interference cancelation indication information is fed back to a network side, which resolves the problem of low efficiency of a scheduler on the network side because of CQI fluctuation in NAIC in the prior art, implements more efficient scheduling on UE by the network side, and makes full use of an interference cancelation gain.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
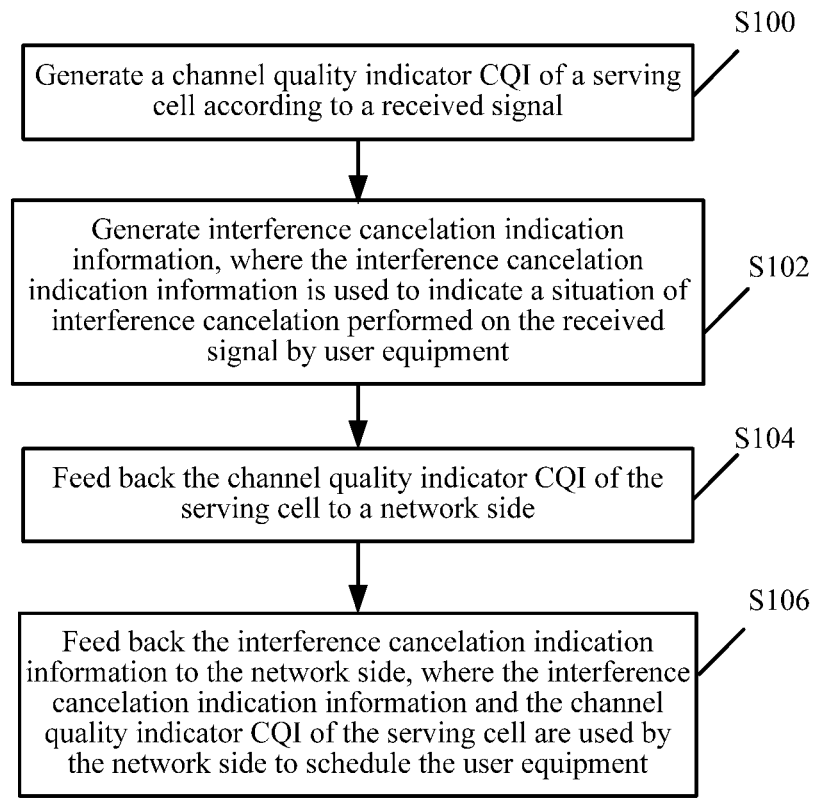
FIG. 1 is a schematic flowchart of an interference cancelation feedback method according to the present invention.

Refer to FIG. 1, which is a schematic flowchart of an interference cancelation feedback method according to the present invention. The method includes:

Step S100: Generate a channel quality indicator CQI of a serving cell according to a received signal.

Specifically, the received signal includes a serving cell signal and an interference cell signal, where an interference cell interferes with the serving cell of user equipment.

Step S102: Generate interference cancelation indication information, where the interference cancelation indication information is used to indicate a situation of interference cancelation performed on the received signal by user equipment.

Step S104: Feed back the channel quality indicator CQI of the serving cell to a network side.

Step S106: Feed back the interference cancelation indication information to the network side, where the interference cancelation indication information and the channel quality indicator CQI of the serving cell are used by the network side to schedule the user equipment.

In each embodiment of the present invention, a network side is a general description, and is specifically a network device that is configured to receive interference cancelation indication information, and may be configured to schedule user equipment. Specifically, the user equipment may be an entity, such as a base station or a base station controller.

Further, when a receiver of the UE is a post-decoding IC receiver, this embodiment of the present invention further includes: a step of decoding the interference cell signal to obtain a decoding result. Specifically, specific implementation of step S100 may include the following situations:

a. when the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate that the user equipment already completes interference cancelation on the received signal, that is, specifically, the reconstructed signal of the interference cell signal is canceled from the received signal only when the interference cell signal is decoded correctly;

b. when the decoding result is incorrect, determining to skip the operation of canceling a reconstructed signal of the interference cell signal from the received signal, and using a channel quality indicator CQI generated without performing interference cancelation as the channel quality indicator CQI of the serving cell, where the interference cancelation indication information is used to indicate that the user equipment does not perform interference cancelation on the received signal, that is, specifically, the reconstructed signal of the interference cell signal is not canceled from the received signal when the interference cell signal is decoded incorrectly; and c. regardless of whether the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate whether the decoding result generated before interference cancelation is performed is correct, that is, specifically, the reconstructed signal of the interference cell signal is canceled from the received signal regardless of whether the interference cell signal is decoded correctly. This method is used in a soft reconstruction interference cancelation receiver, and even if decoding is performed incorrectly, the interference signal can be partially canceled. When the interference cell signal is decoded correctly, the generated interference cancelation indication information is used to indicate that a corresponding fed-back channel quality indicator CQI is a channel quality indicator CQI generated after soft value reconstruction and cancelation of an interference cell code block is performed after interference cell code block decoding is performed correctly. When the interference cell signal is decoded incorrectly, the generated interference cancelation indication information is used to indicate that a corresponding fed-back channel quality indicator CQI is a channel quality indicator CQI generated after soft value reconstruction and cancelation of an interference cell code block is performed after interference cell code block decoding is performed incorrectly.

Still further, when the receiver of the UE is a pre-decoding IC receiver, the UE performs pre-decoding demodulation on a scheduling code block of the interference cell, and performs reconstruction and cancelation. In this case, step S100 in this embodiment of the present invention may include:

determining to cancel a reconstructed signal of the interference cell signal from the received signal; and if a channel quality indicator CQI generated after interference cell cancelation is greater than a channel quality indicator CQI generated without performing interference cancelation, using the channel quality indicator CQI generated after interference cell cancelation as the channel quality indicator CQI of the serving cell, where the interference cancelation indication information is used to indicate that the user equipment already completes interference cancelation on the received signal; or if a channel quality indicator CQI generated after interference cell cancelation is less than a channel quality indicator CQI generated without performing interference cancelation, using the channel quality indicator CQI generated without performing interference cancelation as the channel quality indicator CQI of the serving cell, where the interference cancelation indication information is used to indicate that the user equipment does not perform interference cancelation on the received signal.

Specifically, that is, the pre-decoding IC receiver does not need to perform decoding on the interference cell signal, and therefore, after determining to cancel the reconstructed signal of the interference cell signal from the received signal, the UE may determine, by comparing a CQI generated after interference cell cancelation with a CQI generated before interference cell cancelation, whether the CQI fed back to the network side is the CQI generated after interference cell cancelation or the CQI generated before interference cell cancelation. Further, when the CQI generated after interference cell cancelation is greater than the CQI generated before interference cell cancelation, the CQI generated after interference cell cancelation is fed back to the network side, where interference cancelation indication information generated in this case is used to indicate that the user equipment already completes interference cancelation on the received signal. When the CQI generated after interference cell cancelation is less than the CQI generated before interference cell cancelation, the CQI generated before interference cell cancelation is fed back to the network side, where interference cancelation indication information generated in this case is used to indicate that the user equipment does not perform interference cancelation on the received signal.

Still further, the UE side may negotiate with the network side to feed back the interference cancelation indication information by using an inherent channel or by using a newly added channel, and preferably, step S104 and step S106 may be combined, that is, when feeding back the channel quality indicator CQI of the serving cell to the network side, the UE side may feed back the interference cancelation indication information.

Figure 2:
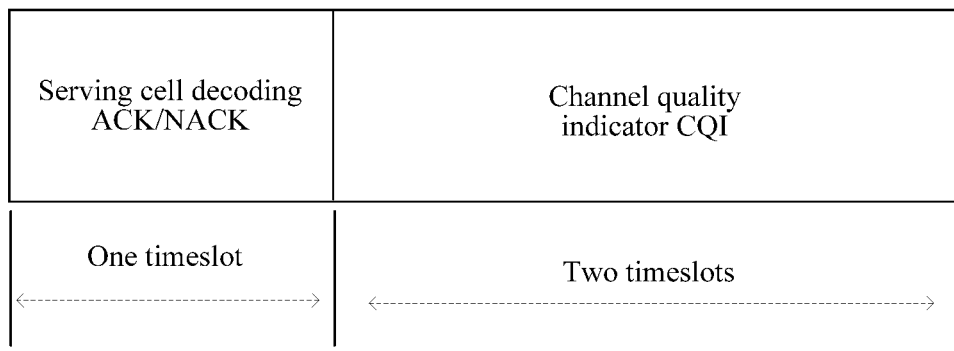
FIG. 2 is a schematic structural diagram of a design of an HS-DPCCH channel in the prior art.

Further, the UE in this embodiment of the present invention may feed back the interference cancelation indication information by using an inherent high speed dedicated physical control channel (High Speed-Dedicated Physical Control Channel, HS-DPCCH). More specifically:

FIG. 2 is a schematic structural diagram of a design of an HS-DPCCH channel in the prior art. UE may feed back, by using an HS-DPCCH channel, an ACK/NACK of decoding a serving cell and a CQI of the serving cell to a network side.

Figure 3:
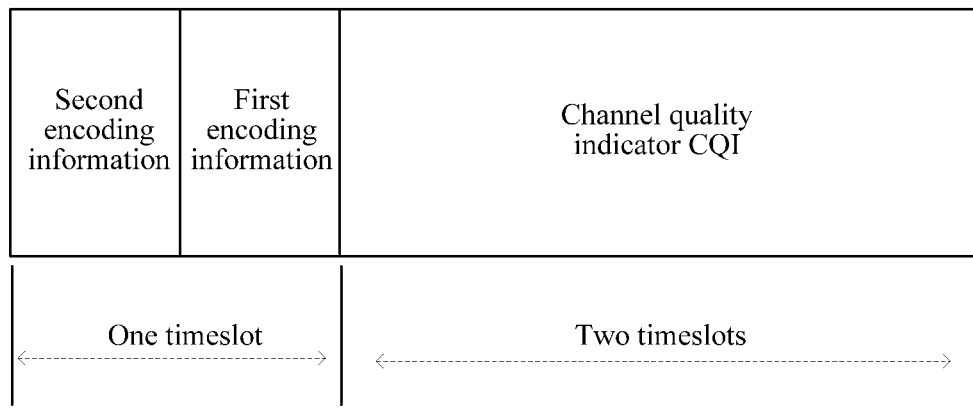
FIG. 3 is a schematic structural diagram of a design of an HS-DPCCH channel according to an embodiment of the present invention.

FIG. 3 is a schematic structural diagram of a design of an HS-DPCCH channel according to an embodiment of the present invention. After encoding the interference cancelation indication information in step S102 to obtain first encoding information, UE may conjoin the first encoding information and second encoding information that is obtained after encoding an ACK/NACK of decoding a serving cell, and place the conjoined information in a first timeslot, and therefore, when feeding back, by using a high speed dedicated physical control channel, the ACK/NACK of decoding the serving cell to a network side and a CQI, the UE further feeds back the interference cancelation indication information in this embodiment of the present invention to the network side.

It can be understood that, when the interference cancelation indication information in this embodiment of the present invention may be interference cancelation acknowledgment ACK information or interference cancelation negative-acknowledgment NACK information, specifically:

when the UE side needs to decode the interference cell signal, if the interference cell signal is decoded correctly, interference cancelation acknowledgment ACK information is generated, where the interference cancelation acknowledgment ACK information is used to indicate that the corresponding fed-back channel quality indicator CQI is a channel quality indicator CQI generated after interference cancelation, or to indicate that the corresponding fed-back channel quality indicator CQI is a channel quality indicator CQI generated after reconstruction and cancelation are performed after the interference cell code block decoding is performed correctly. When the interference cell code block decoding is performed incorrectly, interference cancelation negative-acknowledgment NACK information is generated, where the interference cancelation negative-acknowledgment NACK information is used to indicate that the corresponding fed-back channel quality indicator CQI is a channel quality indicator CQI generated before interference cancelation, or to indicate that the corresponding fed-back channel quality indicator CQI is a channel quality indicator CQI generated after reconstruction and cancelation are performed after the interference cell code block decoding is performed incorrectly; and when the UE side does not need to decode the interference cell signal, if the CQI generated after interference cell cancelation is greater than the CQI generated before interference cell cancelation, interference cancelation acknowledgment ACK information is generated, where the interference cancelation acknowledgment ACK information is used to indicate that the corresponding fed-back channel quality indicator CQI is a channel quality indicator CQI generated after interference cancelation; or if the CQI generated after interference cell cancelation is less than the CQI generated before interference cell cancelation, interference cancelation negative-acknowledgment NACK information is generated, where the interference cancelation negative-acknowledgment NACK information is used to indicate that the corresponding fed-back channel quality indicator CQI is a channel quality indicator CQI generated before interference cancelation.

More specifically, the interference cell signal in this embodiment of the present invention may include at least two interference code blocks, and the interference cancelation indication information may include at least two pieces of interference cancelation indication information that respectively correspond to the at least two interference code blocks; and the at least two interference code blocks may include respective interference code blocks of at least two interference cells or at least two interference code blocks of one interference cell.

Therefore, the foregoing step of encoding the interference cancelation indication information to obtain first encoding information may include: jointly encoding the at least two pieces of interference cancelation indication information to obtain the first encoding information.

It should be noted that, in this embodiment of the present invention, the UE feeds back the interference cancelation indication information to the network side by using the design of the HS-DPCCH channel shown in FIG. 3, so that not only the inherent channel may be used (that is, some small changes in the inherent channel are performed), but also because the serving cell does not need to perform retransmission control by using the interference cancelation indication information, the interference cancelation indication information may be sent at relatively small power relative to the ACK of the serving cell, which quite facilitates implementation.

Additionally, after the interference cancelation indication information is encoded, the encoded interference cancelation indication information and an encoding code word that is obtained after an ACK/NACK of decoding the serving cell is encoded are conjoined, which considers a situation in which the interference cell schedules multiple-input multiple-output (Multiple-Input Multiple-Output, MIMO), and avoids a reduction in ACK decoding performance of the serving cell.

It can be understood that, a solution in this embodiment of the present invention that the UE feeds back the interference cancelation indication information to the network side is not limited to use of the design of the HS-DPCCH channel shown in FIG. 3 as long as the solution is a feedback solution that the UE side and the network side jointly negotiate, and details are not described herein again.

In implementation of this embodiment of the present invention, interference cancelation indication information is fed back to a network side, which resolves a problem of low efficiency of a scheduler on the network side because of CQI fluctuation in NAIC in the prior art, implements more efficient scheduling on UE by the network side, and makes full use of an interference cancelation gain.

The foregoing describes the interference cancelation feedback method according to an embodiment of the present invention in detail, and for convenience of better implementing the foregoing solution of the embodiment of the present invention, the following correspondingly further provides a user equipment scheduling method.

Figure 4:
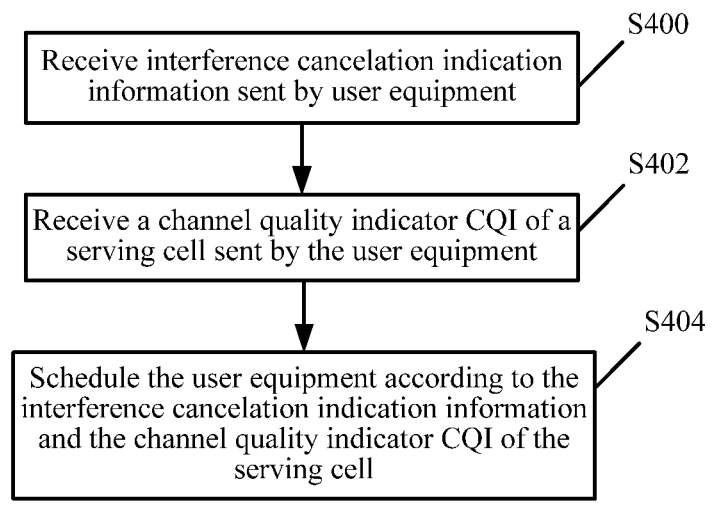
FIG. 4 is a schematic flowchart of a first embodiment of a user equipment scheduling method according to the present invention.

FIG. 4 is a schematic flowchart of a first embodiment of a user equipment scheduling method according to the present invention. The user equipment scheduling method includes:

Step S400: Receive interference cancelation indication information sent by user equipment.

Specifically, the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment.

Step S402: Receive a channel quality indicator CQI of a serving cell sent by the user equipment.

Step S404: Schedule the user equipment according to the interference cancelation indication information and the channel quality indicator CQI of the serving cell.

Specifically, for how the user equipment UE side specifically generates and feeds back the interference cancelation indication information, reference may be made to the implementation manner in the embodiment of FIG. 1 to FIG. 3, and details are not described herein again. Referring to the embodiment of FIG. 1 to FIG. 3, the interference cancelation indication information in this embodiment of the present invention may include the following several situations:

a. The interference cancelation indication information may be used to indicate that the user equipment already completes interference cancelation on the received signal, and the channel quality indicator CQI of the serving cell is a channel quality indicator CQI generated after the user equipment performs interference cancelation on the received signal. The interference cancelation indication information may be further specifically used to indicate that the user equipment already completes interference cancelation on the received signal after the interference cell signal is decoded correctly.

b. The interference cancelation indication information is used to indicate that the user equipment does not perform interference cancelation on the received signal, and the channel quality indicator CQI of the serving cell is a channel quality indicator CQI generated without performing interference cancelation. The interference cancelation indication information may be further specifically used to indicate that the user equipment does not perform interference cancelation on the received signal after the interference cell signal is decoded incorrectly.

c. The interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

The network side may modify, according to the interference cancelation indication information, the CQI fed back by the UE and then schedule the UE, thereby making full use of the interference cancelation gain.

Figure 5:
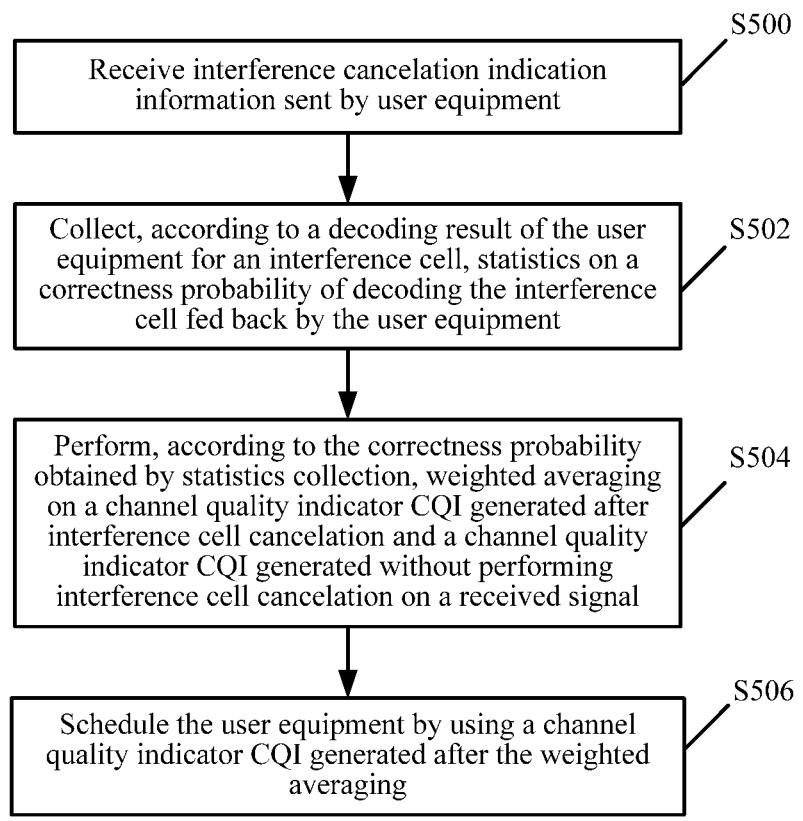
FIG. 5 is a schematic flowchart of a second embodiment of a user equipment scheduling method according to the present invention.

Further, an implementation manner in which the network side schedules the user equipment according to the interference cancelation indication information fed back by the UE is described in detail below by using an example with reference to FIG. 5 to FIG. 8:

FIG. 5 is a schematic flowchart of a second embodiment of a user equipment scheduling method according to the present invention. When user equipment needs to perform interference cell code block decoding, the user equipment scheduling method includes:

Step S500: Receive interference cancelation indication information sent by user equipment.

Specifically, the interference cancelation indication information may indicate that the user equipment already completes interference cancelation on the received signal after the interference cell signal is decoded correctly, or indicate that the user equipment does not perform interference cancelation on the received signal after the interference cell signal is decoded incorrectly.

Step S502: Collect, according to a decoding result of an interference cell from the user equipment, statistics on a correctness probability of decoding the interference cell fed back by the user equipment.

Specifically, for example, if in ten-time information that is fed back by the user equipment within a period of time and on which statistics are collected by the network side, eight-time information is information about correct decoding, and two-time information is information about incorrect decoding, it is obtained that a correctness probability for interference cell code block decoding fed back by the user equipment is 80%, and an incorrectness probability for interference cell code block decoding is 20%.

Step S504: Perform, according to the correctness probability obtained by statistics collection, weighted averaging on a channel quality indicator CQI generated after interference cell cancelation and a channel quality indicator CQI generated without performing interference cell cancelation on a received signal.

Specifically, for example, the foregoing obtained correctness probability for interference cell code block decoding fed back by the user equipment is 80%, and the foregoing obtained incorrectness probability for interference cell code block decoding fed back by the user equipment is 20%, and therefore, weighted averaging is respectively performed, by using 80% and 20%, on a corresponding channel quality indicator CQI generated after interference cell cancelation and a corresponding channel quality indicator CQI generated before interference cell cancelation.

Step S506: Schedule the user equipment by using a channel quality indicator CQI generated after the weighted averaging.

Figure 6:
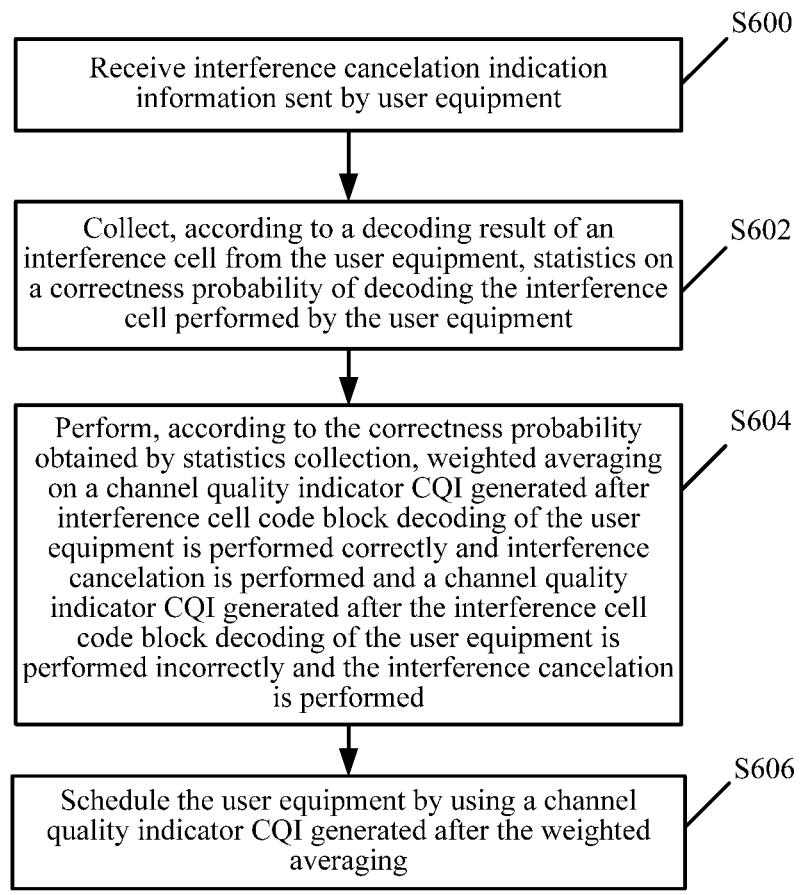
FIG. 6 is a schematic flowchart of a third embodiment of a user equipment scheduling method according to the present invention.

FIG. 6 is a schematic flowchart of a third embodiment of a user equipment scheduling method according to the present invention. When user equipment needs to perform interference cell code block decoding, the user equipment scheduling method includes:

Step S600: Receive interference cancelation indication information sent by user equipment.

Specifically, the interference cancelation indication information may indicate whether a decoding result of the interference cell generated before the user equipment performs interference cancelation is correct.

Step S602: Collect, according to a decoding result of an interference cell from the user equipment, statistics on a correctness probability of decoding the interference cell performed by the user equipment.

Specifically, for example, if in ten-time information that is fed back by the user equipment within a period of time and on which statistics are collected by the network side, eight-time information is information about reconstruction and cancelation performed after correct decoding, and two-time information is information about reconstruction and cancelation performed after incorrect decoding, it is obtained that a correctness probability for interference cell code block decoding fed back by the user equipment is 80%, and an incorrectness probability for interference cell code block decoding is 20%.

Step S604: Perform, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed.

Specifically, for example, the foregoing obtained correctness probability for interference cell code block decoding fed back by the user equipment is 80%, and the incorrectness probability of decoding the interference cell fed back by the user equipment is 20%, and therefore, weighted averaging is respectively performed, by using 80% and 20%, on a corresponding CQI generated after performing reconstruction and cancelation after interference cell code block decoding is performed correctly and a corresponding CQI generated after performing reconstruction and cancelation after interference cell code block decoding is performed incorrectly.

Step S606: Schedule the user equipment by using a channel quality indicator CQI generated after the weighted averaging.

Figure 7:
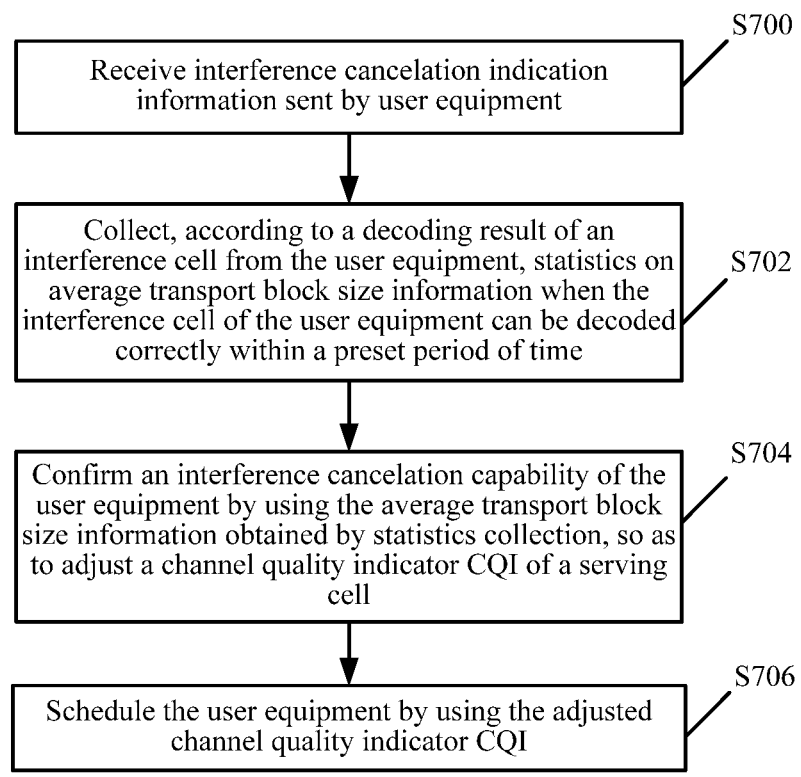
FIG. 7 is a schematic flowchart of a fourth embodiment of a user equipment scheduling method according to the present invention.

FIG. 7 is a schematic flowchart of a fourth embodiment of a user equipment scheduling method according to the present invention. When user equipment needs to perform interference cell code block decoding, the user equipment scheduling method includes:

Step S700: Receive interference cancelation indication information sent by user equipment.

Specifically, the interference cancelation indication information may indicate that the user equipment already completes interference cancelation on the received signal after the interference cell signal is decoded correctly, or indicate that the user equipment does not perform interference cancelation on the received signal after the interference cell signal is decoded incorrectly, or indicate whether a decoding result of an interference cell generated before the user equipment performs interference cancelation is correct.

Step S702: Collect, according to a decoding result of an interference cell from the user equipment, statistics on average transport block size information when the interference cell of the user equipment can be decoded correctly within a preset period of time.

Specifically, when a network side (that is, a serving cell) knows a transmission format of the UE of the interference cell (that is, the interference cell and the serving cell are located on a same NB or in a C-RAN architecture), the network side may collect, according to the interference cancelation indication information, and according to transport block size information scheduled by a corresponding interference cell within a preset period of time, statistics on corresponding TBS size information generated when interference cell code block decoding can be performed correctly (that is, an average TBS size corresponding to each frame) within the period of time (that is, the most recent several frames of data).

Step S704: Confirm an interference cancelation capability of the user equipment by using the average transport block size information obtained by statistics collection, so as to adjust a channel quality indicator CQI of a serving cell.

Specifically, for example, in step S702, statistics on a corresponding average TBS size corresponding to each frame generated when interference cell code block decoding is performed correctly in the most recent several frames is collected; therefore, the average TBS size corresponding to each frame may represent an interference cancelation capability of the UE, and the network side may determine the interference cancelation capability of the UE by determining whether a TBS size to be scheduled by the interference cell in a next frame is greater than the average TBS size corresponding to each frame; and if it is determined that the TBS size to be scheduled by the interference cell in the next frame is greater than the average TBS size corresponding to each frame, it indicates that the UE quite probably performs interference cell code block decoding incorrectly, the interference cancelation capability of the UE is overestimated, and in this case, the serving cell reduces the channel quality indicator CQI, and schedules the UE by using a relatively low CQI; or if it is determined that the TBS size to be scheduled by the interference cell in the next frame is less than the average TBS size corresponding to each frame, it indicates that the UE quite probably performs interference cell code block decoding correctly, the interference cancelation capability of the UE is underestimated, and in this case, the serving cell increases the channel quality indicator CQI, and schedules the UE by using a relatively high CQI.

Step S706: Schedule the user equipment by using the adjusted channel quality indicator CQI.

Figure 8:
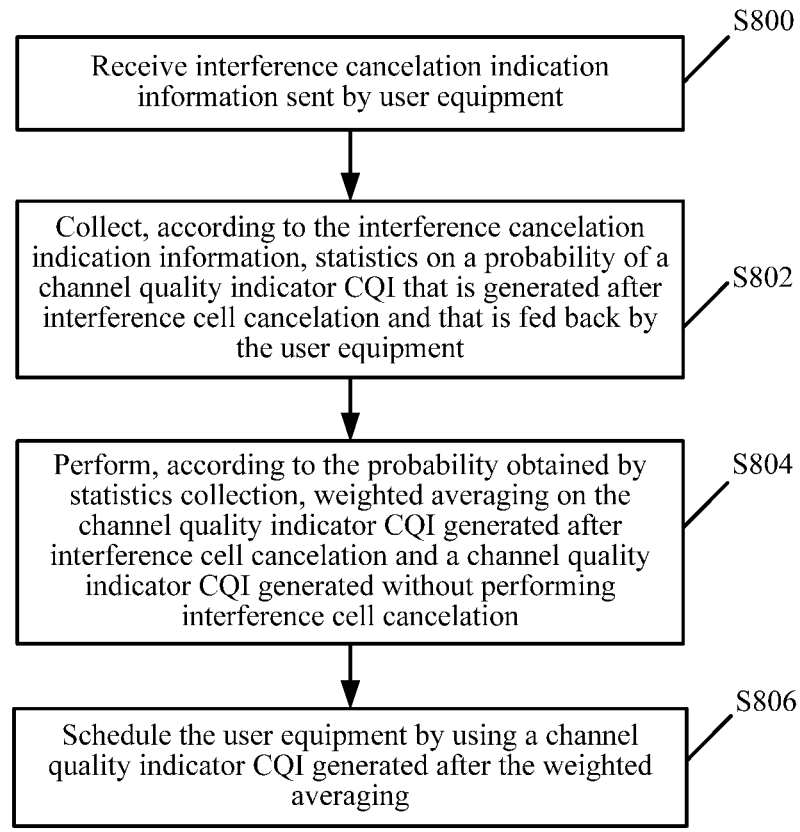
FIG. 8 is a schematic flowchart of a fifth embodiment of a user equipment scheduling method according to the present invention.

FIG. 8 is a schematic flowchart of a fifth embodiment of a user equipment scheduling method according to the present invention. When user equipment does not need to perform interference cell code block decoding, the user equipment scheduling method includes:

Step S800: Receive interference cancelation indication information sent by user equipment.

Specifically, the interference cancelation indication information indicates that the user equipment already completes interference cancelation on the received signal, and the channel quality indicator CQI of the serving cell is a channel quality indicator CQI generated after the user equipment performs interference cancelation on the received signal, or indicates that the user equipment does not perform interference cancelation on the received signal, and the channel quality indicator CQI of the serving cell is a channel quality indicator CQI generated without performing interference cancelation.

Step S802: Collect, according to the interference cancelation indication information, statistics on a probability of the channel quality indicator CQI that is generated after interference cell cancelation and that is fed back by the user equipment.

Specifically, for example, if in ten-time information that is fed back by the user equipment within a period of time and on which statistics are collected by the network side, eight-time information is information generated after interference cell cancelation, and two-time information is information generated before interference cell cancelation, it is obtained that a probability of a corresponding CQI that is generated after interference cell cancelation and that is fed back by the user equipment is 80%, and a probability of a corresponding CQI that is generated before interference cell cancelation and that is fed back by the user equipment is 20%.

Step S804: Perform, according to the probability obtained by statistics collection, weighted averaging on the channel quality indicator CQI generated after interference cell cancelation and a channel quality indicator CQI generated without performing interference cell cancelation.

Specifically, for example, the foregoing obtained probability of the corresponding CQI that is generated after interference cell cancelation and that is fed back by the user equipment is 80%, and the probability of the corresponding CQI that is generated before interference cell cancelation and that is fed back by the user equipment is 20%, and therefore, weighted averaging is respectively performed, by using 80% and 20%, on the corresponding CQI generated after interference cell cancelation and the corresponding CQI generated before interference cell cancelation.

Step S806: Schedule the user equipment by using a channel quality indicator CQI generated after the weighted averaging.

Further, the interference cancelation indication information in this embodiment of the present invention may be interference cancelation acknowledgment ACK information or interference cancelation negative-acknowledgment NACK information, which is specifically:

when the user equipment needs to perform interference cell code block decoding, if the interference cell code block decoding is performed correctly, the generated interference cancelation indication information is the interference cancelation acknowledgment ACK information, where the interference cancelation acknowledgment ACK information is used to indicate that the corresponding fed-back channel quality indicator CQI is a channel quality indicator CQI generated after interference cancelation, or to indicate that the corresponding fed-back channel quality indicator CQI is a channel quality indicator CQI generated after reconstruction and cancelation are performed after the interference cell code block decoding is performed correctly; or when the user equipment needs to perform interference cell code block decoding, if the interference cell code block decoding is performed incorrectly, the generated interference cancelation indication information is the interference cancelation negative-acknowledgment NACK information, where the interference cancelation negative-acknowledgment NACK information is used to indicate that the corresponding fed-back channel quality indicator CQI is a channel quality indicator CQI generated before interference cancelation, or to indicate that the corresponding fed-back channel quality indicator CQI is a channel quality indicator CQI generated after reconstruction and cancelation are performed after the interference cell code block decoding is performed incorrectly; and when the user equipment does not need to perform interference cell code block decoding, if the interference cancelation indication information is the interference cancelation acknowledgment ACK information, the interference cancelation acknowledgment ACK information is used to indicate that the corresponding fed-back channel quality indicator CQI is a channel quality indicator CQI generated after interference cancelation; or if the interference cancelation indication information is the interference cancelation negative-acknowledgment NACK information, the interference cancelation negative-acknowledgment NACK information is used to indicate that the corresponding fed-back channel quality indicator CQI is a channel quality indicator CQI generated before interference cancelation.

In implementation of this embodiment of the present invention, interference cancelation indication information is fed back to a network side, which resolves a problem of low efficiency of a scheduler on the network side because of CQI fluctuation in NAIC in the prior art, implements more efficient scheduling on UE by the network side, and makes full use of an interference cancelation gain.

The foregoing describes the interference cancelation feedback method according to the embodiment of the present invention in detail, and for convenience of better implementing the foregoing solution of the embodiment of the present invention, the following correspondingly further provides a related apparatus configured to cooperatively implement the foregoing solution.

Figure 9:
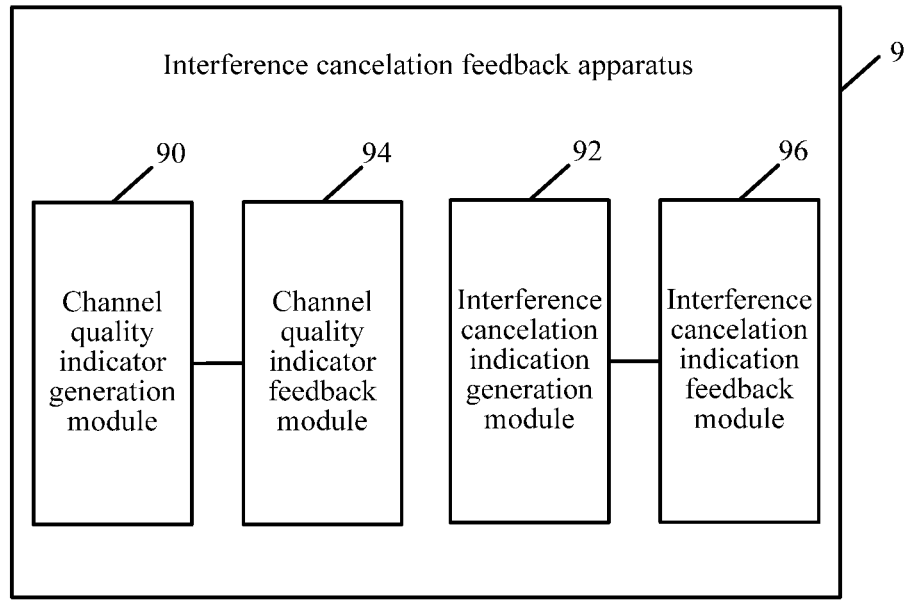
FIG. 9 is a schematic structural diagram of a first embodiment of an interference cancelation feedback apparatus according to the present invention.

FIG. 9 is a schematic structural diagram of a first embodiment of an interference cancelation feedback apparatus according to the present invention. The interference cancelation feedback apparatus 9 includes: a channel quality indicator generation module 90, an interference cancelation indication generation module 92, a channel quality indicator feedback module 94, and an interference cancelation indication feedback module 96, where the channel quality indicator generation module 90 is configured to generate a channel quality indicator CQI of a serving cell according to a received signal, where the received signal includes a serving cell signal and an interference cell signal, where an interference cell interferes with the serving cell of user equipment;

the interference cancelation indication generation module 92 is configured to generate interference cancelation indication information, where the interference cancelation indication information is used to indicate a situation of interference cancelation performed on the received signal by the user equipment;

the channel quality indicator feedback module 94 is configured to feed back the channel quality indicator CQI of the serving cell to a network side; and the interference cancelation indication feedback module 96 is configured to feed back the interference cancelation indication information to the network side, where the interference cancelation indication information and the channel quality indicator CQI of the serving cell are used by the network side to schedule the user equipment.

Figure 10:
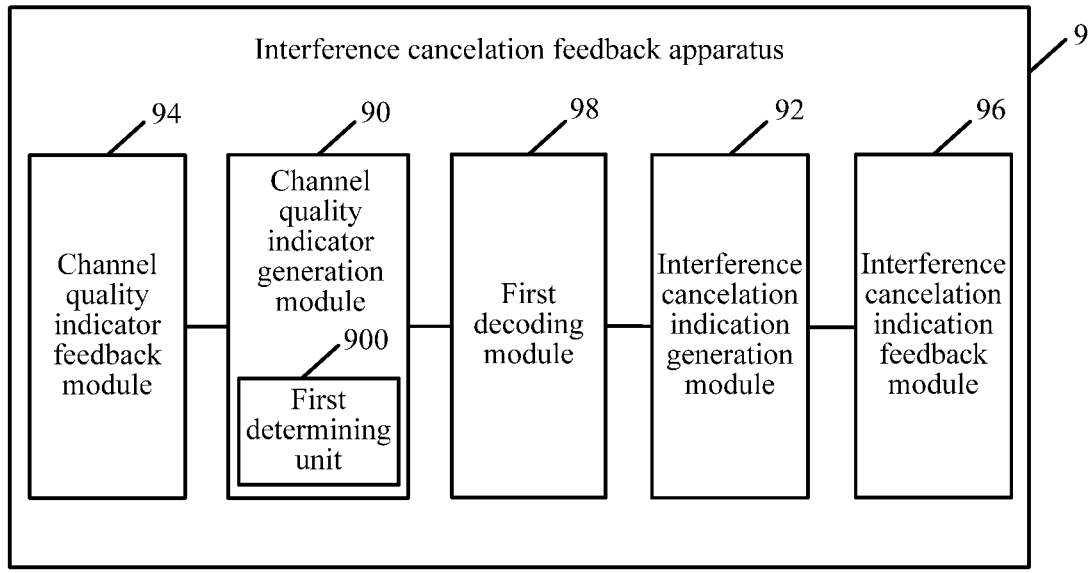
FIG. 10 is a schematic structural diagram of a second embodiment of an interference cancelation feedback apparatus according to the present invention.

FIG. 10 is a schematic structural diagram of a second embodiment of an interference cancelation feedback apparatus according to the present invention. In addition to a channel quality indicator generation module 90, an interference cancelation indication generation module 92, a channel quality indicator feedback module 94, and an interference cancelation indication feedback module 96, the interference cancelation feedback apparatus 9 may further include a first decoding module 98, and the channel quality indicator generation module 90 includes a first determining unit 900, where the first decoding module 98 is configured to decode the interference cell signal to obtain a decoding result; and the first determining unit 900 is configured to: when the decoding result of the first decoding module 98 is correct, determine to cancel a reconstructed signal of the interference cell signal from the received signal, and use a channel quality indicator CQI generated after interference cancelation as the channel quality indicator CQI of the serving cell, where the interference cancelation indication information generated by the interference cancelation indication generation module 92 is used to indicate that the user equipment already completes interference cancelation on the received signal.

Figure 11:
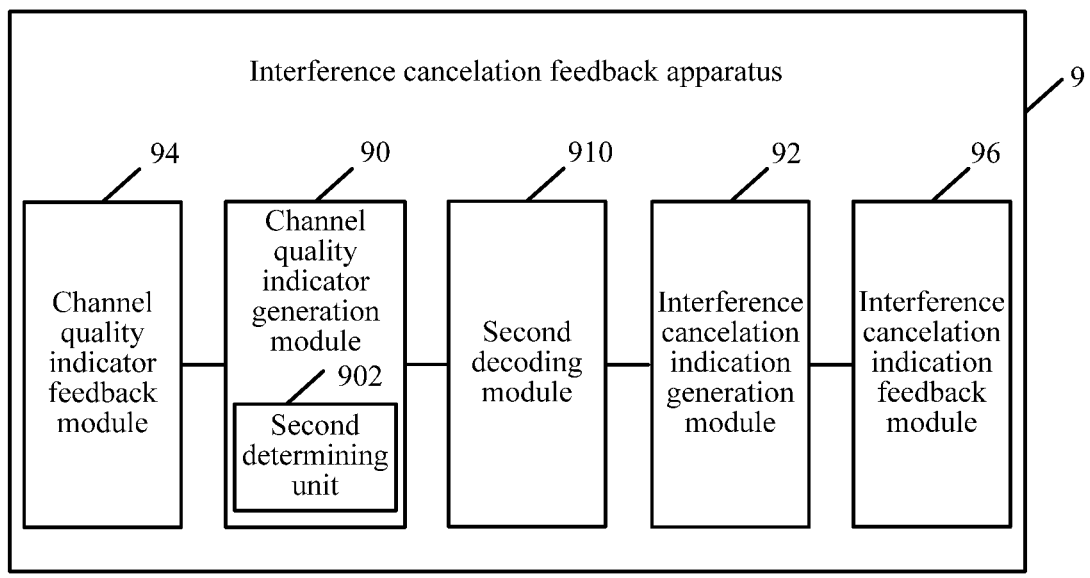
FIG. 11 is a schematic structural diagram of a third embodiment of an interference cancelation feedback apparatus according to the present invention.

FIG. 11 is a schematic structural diagram of a third embodiment of an interference cancelation feedback apparatus according to the present invention. In addition to a channel quality indicator generation module 90, an interference cancelation indication generation module 92, a channel quality indicator feedback module 94, and an interference cancelation indication feedback module 96, the interference cancelation feedback apparatus 9 may further include a second decoding module 910, and the channel quality indicator generation module 90 includes a second determining unit 902, where the second decoding module 910 is configured to decode the interference cell signal to obtain a decoding result; and the second determining unit 902 is configured to: when the decoding result of the second decoding module 910 is incorrect, determine to skip the operation of canceling a reconstructed signal of the interference cell signal from the received signal, and use a channel quality indicator CQI generated without performing interference cancelation as the channel quality indicator CQI of the serving cell, where the interference cancelation indication information generated by the interference cancelation indication generation module 92 is used to indicate that the user equipment does not perform interference cancelation on the received signal.

Figure 12:
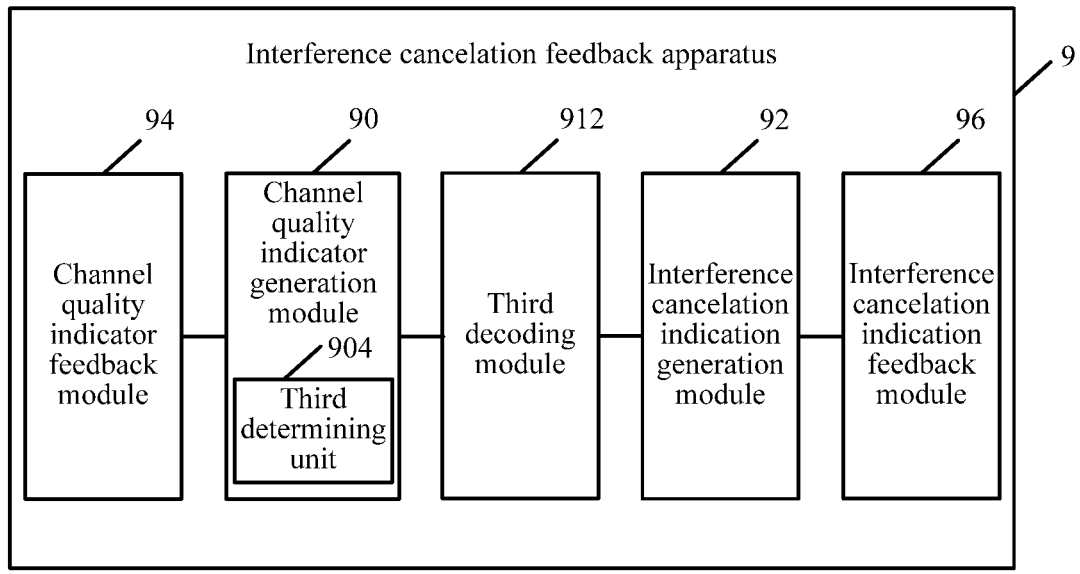
FIG. 12 is a schematic structural diagram of a fourth embodiment of an interference cancelation feedback apparatus according to the present invention.

FIG. 12 is a schematic structural diagram of a fourth embodiment of an interference cancelation feedback apparatus according to the present invention. In addition to a channel quality indicator generation module 90, an interference cancelation indication generation module 92, a channel quality indicator feedback module 94, and an interference cancelation indication feedback module 96, the interference cancelation feedback apparatus 9 may further include a third decoding module 912, and the channel quality indicator generation module 90 includes a third determining unit 904, where the third decoding module 912 is configured to decode the interference cell signal to obtain a decoding result; and the third determining unit 904 is configured to: regardless of whether the decoding result of the third decoding module 912 is correct, determine to cancel a reconstructed signal of the interference cell signal from the received signal, and use a channel quality indicator CQI generated after interference cancelation as the channel quality indicator CQI of the serving cell, where the interference cancelation indication information generated by the interference cancelation indication generation module 92 is used to indicate whether the decoding result generated before interference cancelation is performed is correct.

It should be noted that, the first decoding module 98, the second decoding module 910, and the third decoding module 912 in the embodiments of the present invention may be a same functional module, or may be different independent functional modules.

Figure 13:
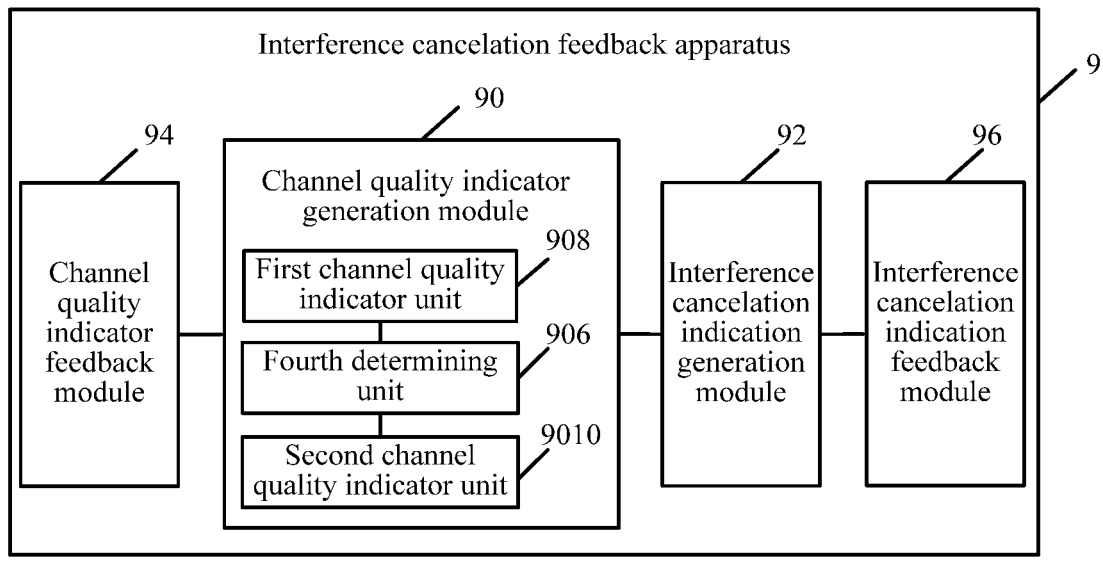
FIG. 13 is a schematic structural diagram of a fifth embodiment of an interference cancelation feedback apparatus according to the present invention.

FIG. 13 is a schematic structural diagram of a fifth embodiment of an interference cancelation feedback apparatus according to the present invention. A channel quality indicator generation module 90 of the interference cancelation feedback apparatus 9 includes: a fourth determining unit 906, a first channel quality indicator unit 908, and a second channel quality indicator unit 9010, where the fourth determining unit 906 is configured to determine to cancel a reconstructed signal of the interference cell signal from the received signal;

the first channel quality indicator unit 908 is configured to: if a channel quality indicator CQI generated after interference cell cancelation is greater than a channel quality indicator CQI generated without performing interference cancelation, use the channel quality indicator CQI generated after interference cell cancelation as the channel quality indicator CQI of the serving cell, where the interference cancelation indication information generated by the interference cancelation indication generation module is used to indicate that the user equipment already completes interference cancelation on the received signal; and the second channel quality indicator unit 9010 is configured to: if the channel quality indicator CQI generated after interference cell cancelation is less than the channel quality indicator CQI generated without performing interference cancelation, use the channel quality indicator CQI generated without performing interference cancelation as the channel quality indicator CQI of the serving cell, where the interference cancelation indication information generated by the interference cancelation indication generation module is used to indicate that the user equipment does not perform interference cancelation on the received signal.

Figure 14:
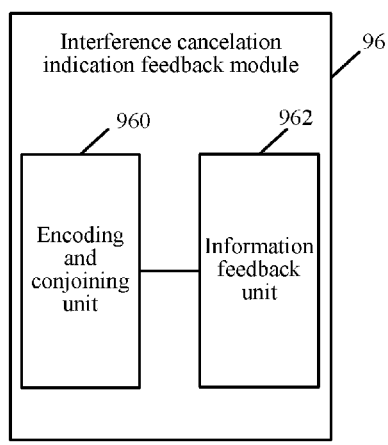
FIG. 14 is a schematic structural diagram of an interference cancelation indication feedback module according to an embodiment of the present invention.

Still further, FIG. 14 is a schematic structural diagram of an interference cancelation indication feedback module according to an embodiment of the present invention. The interference cancelation indication feedback module 96 may include an encoding and conjoining unit 960 and an information feedback unit 962, where the encoding and conjoining unit 960 is configured to encode the interference cancelation indication information to obtain first encoding information, encode a decoding result of decoding the serving cell to obtain second encoding information, and conjoin the first encoding information and the second encoding information to obtain conjoined information; and the information feedback unit 962 is configured to feed back the conjoined information to the network side by using a high speed dedicated physical control channel.

Specifically, the interference cell signal in this embodiment of the present invention may include at least two interference code blocks, and the interference cancelation indication information may include at least two pieces of interference cancelation indication information that respectively correspond to the at least two interference code blocks; and the at least two interference code blocks may include respective interference code blocks of at least two interference cells or at least two interference code blocks of one interference cell.

Therefore, the encoding, by the encoding and conjoining unit 960, the interference cancelation indication information to obtain the first encoding information specifically includes: jointly encoding the at least two pieces of interference cancelation indication information to obtain the first encoding information.

Still further, in this embodiment of the present invention, when feeding back the channel quality indicator CQI of the serving cell to the network side, the channel quality indicator feedback module 94 feeds back the interference cancelation indication information to the network side. That is, the interference cancelation indication information may be directly fed back by the channel quality indicator feedback module 94 when the channel quality indicator CQI of the serving cell is being fed back to the network side, and does not need to be independently fed back by the interference cancelation indication feedback module 96.

It can be understood that, functions of functional modules of the interference cancelation feedback apparatus 9 in this embodiment may be specifically implemented according to the method in the foregoing method embodiment. For details, reference may be correspondingly made to the related description of the method embodiment in FIG. 1 to FIG. 3, and details are not described herein again.

In implementation of this embodiment of the present invention, interference cancelation acknowledgment ACK information or interference cancelation negative-acknowledgment NACK information is fed back to a network side, which resolves a problem of low efficiency of a scheduler on the network side because of CQI fluctuation in NAIC in the prior art, implements more efficient scheduling on UE by the network side, and makes full use of an interference cancelation gain.

The foregoing describes the interference cancelation feedback apparatus according to the embodiments of the present invention in detail, and for convenience of better implementing the foregoing solution of the embodiment of the present invention, the following correspondingly further provides a user equipment scheduling apparatus.

Figure 15:
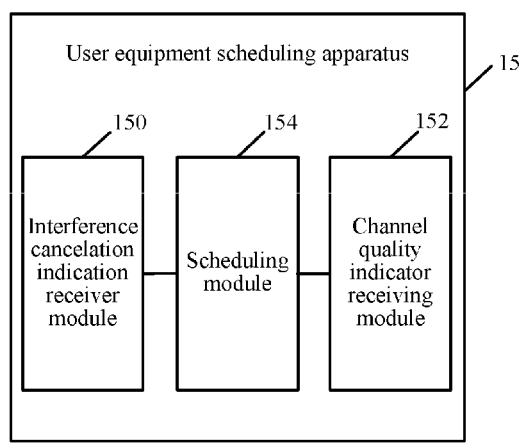
FIG. 15 is a schematic structural diagram of a user equipment scheduling apparatus according to an embodiment of the present invention.

FIG. 15 is a schematic structural diagram of a user equipment scheduling apparatus according to an embodiment of the present invention. The user equipment scheduling apparatus 15 includes an interference cancelation indication receiver module 150, a channel quality indicator receiving module 152, and a scheduling module 154, where the interference cancelation indication receiver module 150 is configured to receive interference cancelation indication information sent by user equipment, where the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment;

the channel quality indicator receiving module 152 is configured to receive a channel quality indicator CQI of the serving cell sent by the user equipment; and the scheduling module 154 is configured to schedule the user equipment according to the interference cancelation indication information and the channel quality indicator CQI of the serving cell.

Specifically, the interference cancelation indication information in this embodiment of the present invention may include the following several situations:

a. The interference cancelation indication information may be used to indicate that the user equipment already completes interference cancelation on the received signal, and the channel quality indicator CQI of the serving cell is a channel quality indicator CQI generated after the user equipment performs interference cancelation on the received signal. The interference cancelation indication information may be further specifically used to indicate that the user equipment already completes interference cancelation on the received signal after the interference cell signal is decoded correctly.

b. The interference cancelation indication information is used to indicate that the user equipment does not perform interference cancelation on the received signal, and the channel quality indicator CQI of the serving cell is a channel quality indicator CQI generated without performing interference cancelation. The interference cancelation indication information may be further specifically used to indicate that the user equipment does not perform interference cancelation on the received signal after the interference cell signal is decoded incorrectly.

c. The interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

Figure 16:
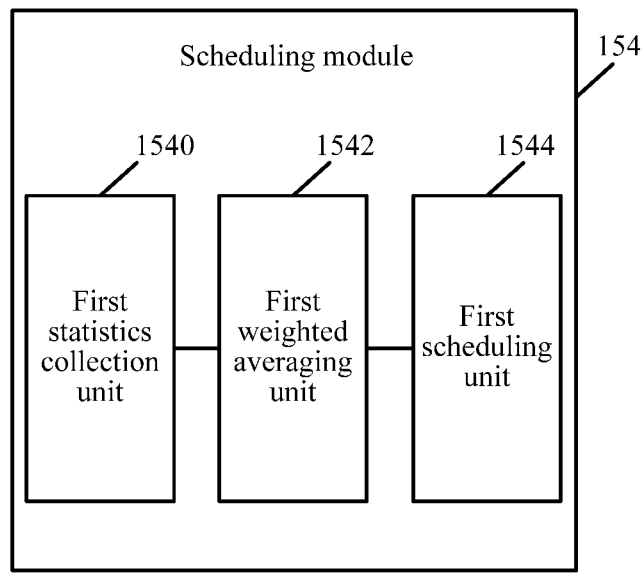
FIG. 16 is a schematic structural diagram of a first embodiment of a scheduling module according to the present invention.

Further, FIG. 16 is a schematic structural diagram of a first embodiment of a scheduling module according to the present invention. When user equipment needs to perform interference cell code block decoding, the scheduling module 154 may include a first statistics collection unit 1540, a first weighted averaging unit 1542, and a first scheduling unit 1544, where the first statistics collection unit 1540 is configured to collect, according to the decoding result of the interference cell from the user equipment, statistics on a correctness probability of decoding the interference cell fed back by the user equipment;

the first weighted averaging unit 1542 is configured to perform, according to the correctness probability obtained by statistics collection, weighted averaging on the channel quality indicator CQI generated after interference cell cancelation and a channel quality indicator CQI generated without performing interference cell cancelation on the received signal; and the first scheduling unit 1544 is configured to schedule the user equipment by using a channel quality indicator CQI generated after the weighted averaging.

Figure 17:
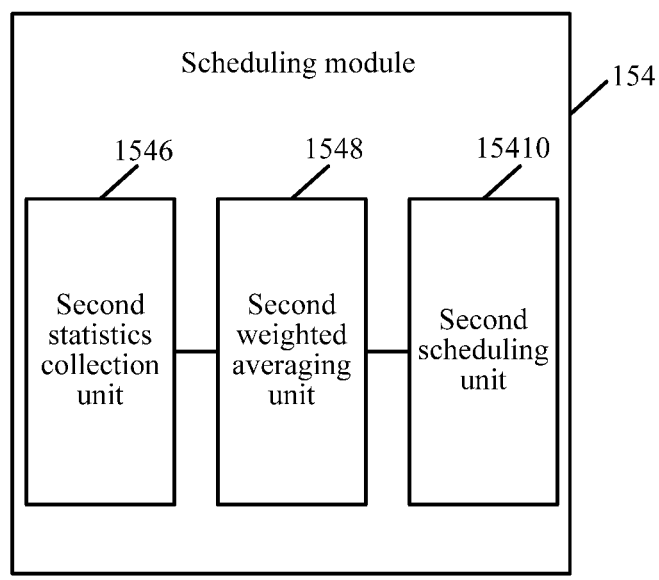
FIG. 17 is a schematic structural diagram of a second embodiment of a scheduling module according to the present invention.

Further, FIG. 17 is a schematic structural diagram of a second embodiment of a scheduling module according to the present invention. When the user equipment needs to perform interference cell code block decoding, the scheduling module 154 may include a second statistics collection unit 1546, a second weighted averaging unit 1548, and a second scheduling unit 15410, where the second statistics collection unit 1546 is configured to collect, according to the decoding result of the interference cell from the user equipment, statistics on a correctness probability of decoding the interference cell performed by the user equipment;

the second weighted averaging unit 1548 is configured to perform, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed; and the second scheduling unit 15410 is configured to schedule the user equipment by using a channel quality indicator CQI generated after the weighted averaging.

Figure 18:
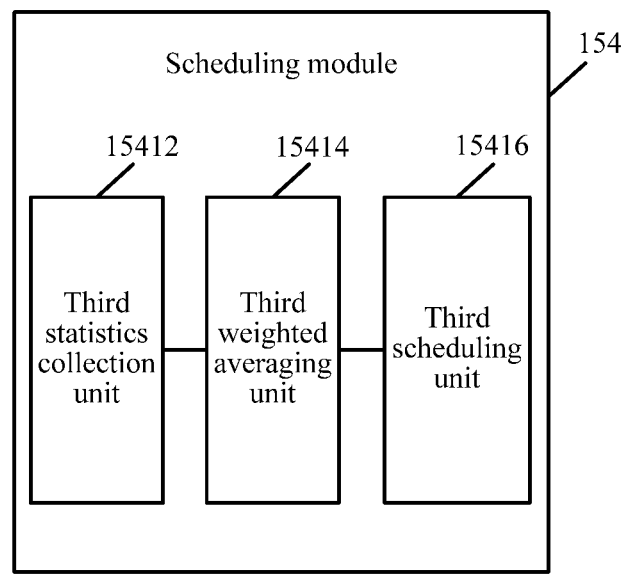
FIG. 18 is a schematic structural diagram of a third embodiment of a scheduling module according to the present invention.

Still further, FIG. 18 is a schematic structural diagram of a third embodiment of a scheduling module according to the present invention. When the user equipment does not need to perform interference cell code block decoding, the scheduling module 154 may include a third statistics collection unit 15412, a third weighted averaging unit 15414, and a third scheduling unit 15416, where the third statistics collection unit 15412 is configured to collect, according to the interference cancelation indication information, statistics on a probability of the channel quality indicator CQI that is generated after interference cell cancelation and that is fed back by the user equipment;

the third weighted averaging unit 15414 is configured to perform, according to the probability obtained by statistics collection, weighted averaging on the channel quality indicator CQI generated after interference cell cancelation and the channel quality indicator CQI generated without performing interference cell cancelation; and the third scheduling unit 15416 is configured to schedule the user equipment by using a channel quality indicator CQI generated after the weighted averaging.

Figure 19:
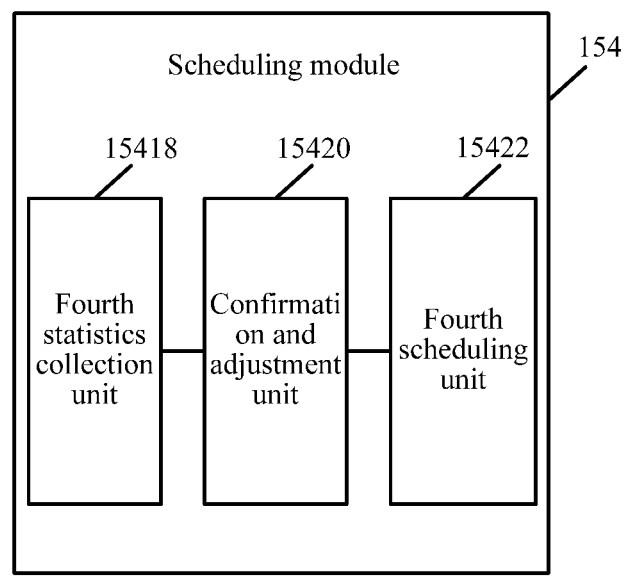
FIG. 19 is a schematic structural diagram of a fourth embodiment of a scheduling module according to the present invention.

Still further, FIG. 19 is a schematic structural diagram of a fourth embodiment of a scheduling module according to the present invention. When the user equipment needs to perform interference cell code block decoding, the scheduling module 154 may include: a fourth statistics collection unit 15418, a confirmation and adjustment unit 15420, and a fourth scheduling unit 15422, where the fourth statistics collection unit 15418 is configured to collect, according to the decoding result of the interference cell from the user equipment, statistics on average transport block size information when the interference cell of the user equipment can be decoded correctly within a preset period of time;

the confirmation and adjustment unit 15420 is configured to confirm an interference cancelation capability of the user equipment by using the average transport block size information obtained by statistics collection, so as to adjust the channel quality indicator CQI of the serving cell; and the fourth scheduling unit 15422 is configured to schedule the user equipment by using the adjusted channel quality indicator CQI.

Figure 20:
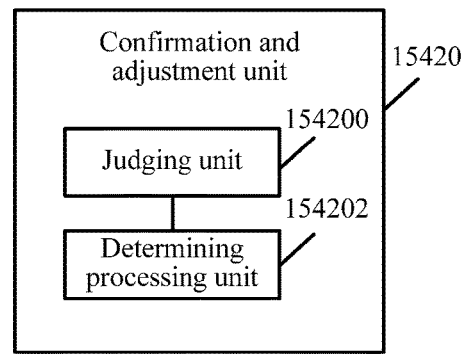
FIG. 20 is a schematic structural diagram of a confirmation and adjustment unit according to an embodiment of the present invention.

Specifically, FIG. 20 is a schematic structural diagram of a confirmation and adjustment unit according to an embodiment of the present invention. The confirmation and adjustment unit 15420 includes: a judging unit 154200 and a determining processing unit 154202, where the judging unit 154200 is configured to determine whether a size of a transport block to be scheduled by the interference cell in a next frame is greater than the average transport block size; and the determining processing unit 154202 is configured to: when a determining result of the judging unit 154200 is yes, reduce the channel quality indicator CQI of the serving cell; or when a determining result of the judging unit 154200 is no, increase the channel quality indicator CQI of the serving cell.

Further, the interference cancelation indication receiver module 150 in this embodiment of the present invention may be specifically configured to: receive, by using a high speed dedicated physical control channel, information obtained by conjoining first encoding information and second encoding information, where the first encoding information is encoding information of the interference cancelation indication information, and the second encoding information is obtained by encoding a decoding result of decoding the serving cell.

Still further, the interference cell signal in this embodiment of the present invention may include at least two interference code blocks, and the interference cancelation indication information may include at least two pieces of interference cancelation indication information that respectively correspond to the at least two interference code blocks; and the at least two interference code blocks may include respective interference code blocks of at least two interference cells or at least two interference code blocks of one interference cell.

Therefore, the second encoding information in this embodiment of the present invention may be obtained by jointly encoding the at least two pieces of interference cancelation indication information.

It can be understood that, functions of functional modules of the user equipment scheduling apparatus 15 in this embodiment may be specifically implemented according to the method in the foregoing method embodiment. For details, reference may be correspondingly made to the related description of the method embodiments in FIG. 4 to FIG. 8, and details are not described herein again.

The foregoing describes the interference cancelation feedback apparatus according to the embodiment of the present invention in detail, and for convenience of better implementing the foregoing solution of the embodiment of the present invention, the following correspondingly further provides user equipment.

Figure 21:
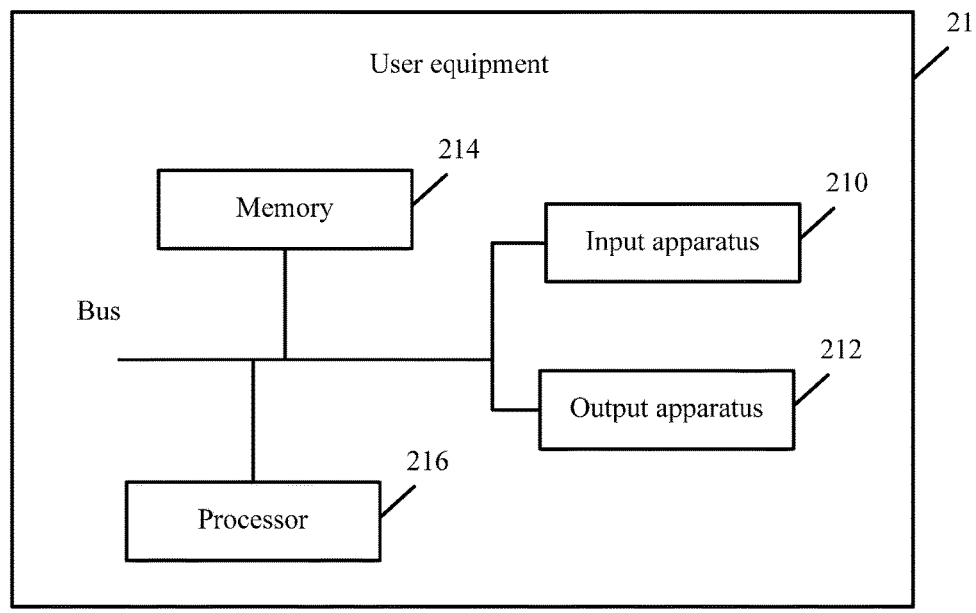
FIG. 21 is a schematic structural diagram of user equipment according to an embodiment of the present invention.

FIG. 21 is a schematic structural diagram of user equipment according to an embodiment of the present invention. The user equipment 21 includes an input apparatus 210, an output apparatus 212, a memory 214, and a processor 216.

The input apparatus 210, the output apparatus 212, the memory 214, and the processor 216 (one or more processors 216 may exist in a network device, and in FIG. 21, one processor is used as an example). In some embodiments of the present invention, the input apparatus 211, the output apparatus 212, the memory 214, and the processor 216 may be connected by using a bus or in another manner, and in FIG. 21, an example in which connection is implemented by using a bus is used.

The processor 216 performs the following steps:

generating a channel quality indicator CQI of a serving cell according to a received signal, where the received signal includes a serving cell signal and an interference cell signal, where an interference cell interferes with the serving cell of user equipment; generating interference cancelation indication information, where the interference cancelation indication information is used to indicate a situation of interference cancelation performed on the received signal by the user equipment; feeding back the channel quality indicator CQI of the serving cell to a network side; and feeding back the interference cancelation indication information to the network side, where the interference cancelation indication information and the channel quality indicator CQI of the serving cell are used by the network side to schedule the user equipment.

Further, the processor 216 further performs: decoding the interference cell signal to obtain a decoding result; and the generating, by the processor 216, a channel quality indicator CQI of a serving cell according to a received signal includes: when the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate that the user equipment already completes interference cancelation on the received signal.

Further, the processor 216 further performs: decoding the interference cell signal to obtain a decoding result; and the generating, by the processor 216, a channel quality indicator CQI of a serving cell according to a received signal includes: when the decoding result is incorrect, determining to skip the operation of canceling a reconstructed signal of the interference cell signal from the received signal, and using a channel quality indicator CQI generated without performing interference cancelation as the channel quality indicator CQI of the serving cell, where the interference cancelation indication information is used to indicate that the user equipment does not perform interference cancelation on the received signal.

Still further, the processor 216 further performs: decoding the interference cell signal to obtain a decoding result; and the generating, by the processor 216, a channel quality indicator CQI of a serving cell according to a received signal includes: regardless of whether the decoding result is correct, determining to cancel a reconstructed signal of the interference cell signal from the received signal, and using a channel quality indicator CQI generated after interference cancelation as the channel quality indicator CQI of the serving cell, where the interference cancelation indication information is used to indicate whether the decoding result generated before interference cancelation is performed is correct.

Still further, the generating, by the processor 216, a channel quality indicator CQI of a serving cell according to a received signal includes:

determining to cancel a reconstructed signal of the interference cell signal from the received signal; and if a channel quality indicator CQI generated after interference cell cancelation is greater than a channel quality indicator CQI generated without performing interference cancelation, using the channel quality indicator CQI generated after interference cell cancelation as the channel quality indicator CQI of the serving cell, where the interference cancelation indication information is used to indicate that the user equipment already completes interference cancelation on the received signal; or if a channel quality indicator CQI generated after interference cell cancelation is less than a channel quality indicator CQI generated without performing interference cancelation, using the channel quality indicator CQI generated without performing interference cancelation as the channel quality indicator CQI of the serving cell, where the interference cancelation indication information is used to indicate that the user equipment does not perform interference cancelation on the received signal.

Still further, the feeding back, by the processor 216, the interference cancelation indication information to the network side includes:

encoding the interference cancelation indication information to obtain first encoding information, encoding a decoding result of decoding the serving cell to obtain second encoding information, and conjoining the first encoding information and the second encoding information to obtain conjoined information; and feeding back the conjoined information to the network side by using a high speed dedicated physical control channel.

Still further, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the encoding, by the processor 216, the interference cancelation indication information to obtain first encoding information includes: jointly encoding the at least two pieces of interference cancelation indication information to obtain the first encoding information.

Still further, the feeding back, by the processor 216, the interference cancelation indication information to the network side includes:

when feeding back the channel quality indicator CQI of the serving cell to the network side, feeding back the interference cancelation indication information to the network side.

It should be noted that, for the embodiment of the foregoing user equipment 21, reference may be correspondingly made to the implementation manner of the method embodiment of FIG. 1 to FIG. 3, and details are not described herein again.

It can be understood that the user equipment 21 in this embodiment of the present invention may be, for example, a mobile communications terminal, a tablet computer, or a personal digital assistant, or another user equipment.

The foregoing describes the user equipment scheduling apparatus according to the embodiment of the present invention in detail, and for convenience of better implementing the foregoing solution of the embodiment of the present invention, the following correspondingly further provides a network device.

Figure 22:
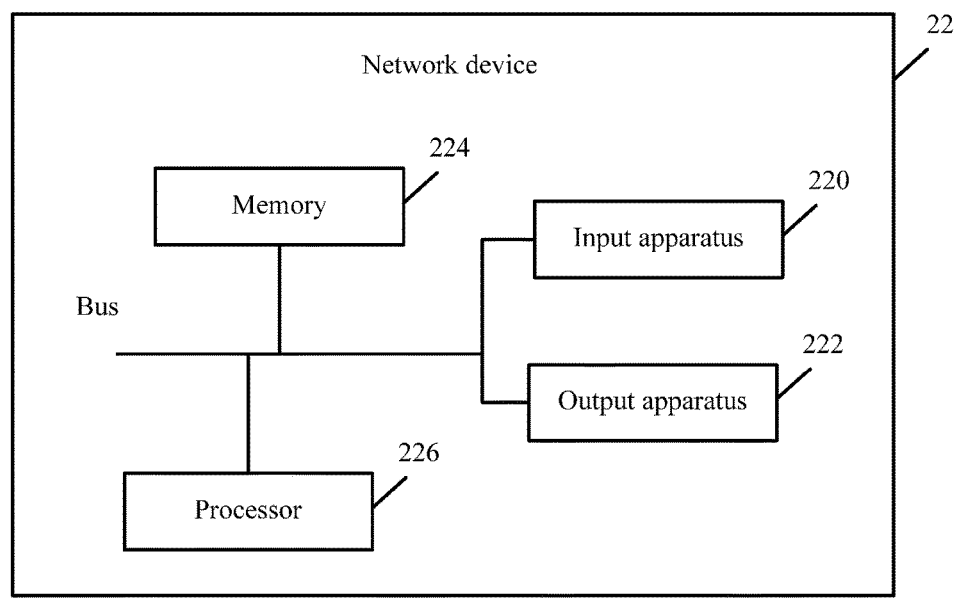
FIG. 22 is a schematic structural diagram of an apparatus of a network device according to an embodiment of the present invention.

FIG. 22 is a schematic structural diagram of an apparatus of a network device according to an embodiment of the present invention. The network device 22 includes an input apparatus 220, an output apparatus 222, a memory 224, and a processor 226.

The input apparatus 220, the output apparatus 222, the memory 224, and the processor 226 (one or more processors 226 may exist in a network device, and in FIG. 22, one processor is used as an example). In some embodiments of the present invention, the input apparatus 221, the output apparatus 222, the memory 224, and the processor 226 may be connected by using a bus or in another manner, and in FIG. 22, an example in which connection is implemented by using a bus is used.

The processor 226 performs the following steps:

receiving interference cancelation indication information sent by user equipment, where the interference cancelation indication information is used to indicate a situation of interference cancelation performed on the received signal by the user equipment, where the received signal of the user equipment includes a serving cell signal and an interference cell signal, where an interference cell interferes with a serving cell of the user equipment; receiving a channel quality indicator CQI of the serving cell sent by the user equipment; and scheduling the user equipment according to the interference cancelation indication information and the channel quality indicator CQI of the serving cell.

Further, the interference cancelation indication information is used to indicate that the user equipment already completes interference cancelation on the received signal, and the channel quality indicator CQI of the serving cell is a channel quality indicator CQI generated after the user equipment performs interference cancelation on the received signal.

Further, the interference cancelation indication information is used to indicate that the user equipment already completes interference cancelation on the received signal after the interference cell signal is decoded correctly.

Still further, the interference cancelation indication information is used to indicate that the user equipment does not perform interference cancelation on the received signal, and the channel quality indicator CQI of the serving cell is a channel quality indicator CQI generated without performing interference cancelation.

Still further, the interference cancelation indication information is used to indicate that the user equipment does not perform interference cancelation on the received signal after the interference cell signal is decoded incorrectly.

Still further, the interference cancelation indication information is used to indicate whether a decoding result of the interference cell generated before the user equipment performs interference cancelation is correct, and the channel quality indicator CQI of the serving cell is a channel quality indicator CQI that is generated after the user equipment performs interference cell cancelation on a channel quality indicator CQI of the received signal.

Still further, the scheduling, by the processor 226, the user equipment according to the interference cancelation indication information and the channel quality indicator CQI of the serving cell includes:

collecting, according to the decoding result of the interference cell from the user equipment, statistics on a correctness probability of decoding the interference cell fed back by the user equipment; performing, according to the correctness probability obtained by statistics collection, weighted averaging on the channel quality indicator CQI generated after interference cell cancelation and a channel quality indicator CQI generated without performing interference cell cancelation on the received signal; and scheduling the user equipment by using a channel quality indicator CQI generated after the weighted averaging; or collecting, according to the decoding result of the interference cell from the user equipment, statistics on a correctness probability of decoding the interference cell performed by the user equipment; performing, according to the correctness probability obtained by statistics collection, weighted averaging on a channel quality indicator CQI generated after interference cell code block decoding of the user equipment is performed correctly and interference cancelation is performed and a channel quality indicator CQI generated after the interference cell code block decoding of the user equipment is performed incorrectly and the interference cancelation is performed; and scheduling the user equipment by using a channel quality indicator CQI generated after the weighted averaging.

Still further, the scheduling, by the processor 226, the user equipment according to the interference cancelation indication information and the channel quality indicator CQI of the serving cell includes:

collecting, according to the interference cancelation indication information, statistics on a probability of the channel quality indicator CQI that is generated after interference cell cancelation and that is fed back by the user equipment; performing, according to the probability obtained by statistics collection, weighted averaging on the channel quality indicator CQI generated after interference cell cancelation and the channel quality indicator CQI generated without performing interference cell cancelation; and scheduling the user equipment by using a channel quality indicator CQI generated after the weighted averaging.

Still further, the scheduling, by the processor 226, the user equipment according to the interference cancelation indication information and the channel quality indicator CQI of the serving cell includes:

collecting, according to the decoding result of the interference cell from the user equipment, statistics on average transport block size information when the interference cell of the user equipment can be decoded correctly within a preset period of time; confirming an interference cancelation capability of the user equipment by using the average transport block size information obtained by statistics collection, so as to adjust the channel quality indicator CQI of the serving cell; and scheduling the user equipment by using the adjusted channel quality indicator CQI.

Still further, the confirming, by the processor 226, an interference cancelation capability of the user equipment by using the average transport block size information obtained by statistics collection, so as to adjust the channel quality indicator CQI of the serving cell includes:

determining whether a size of a transport block to be scheduled by the interference cell in a next frame is greater than the average transport block size; and when a determining result is yes, reducing the channel quality indicator CQI of the serving cell; or when a determining result is no, increasing the channel quality indicator CQI of the serving cell.

Still further, the receiving, by the processor 226, interference cancelation indication information sent by user equipment includes:

receiving, by using a high speed dedicated physical control channel, information obtained by conjoining first encoding information and second encoding information, where the first encoding information is encoding information of the interference cancelation indication information, and the second encoding information is obtained by encoding a decoding result of decoding the serving cell.

Still further, the interference cell signal includes at least two interference code blocks, and the interference cancelation indication information includes at least two pieces of interference cancelation indication information that respectively correspond to the at least two interference code blocks; and the at least two interference code blocks include respective interference code blocks of at least two interference cells or at least two interference code blocks of one interference cell; and the second encoding information is obtained by jointly encoding the at least two pieces of interference cancelation indication information.

It should be noted that, for the embodiment of the foregoing network device 22, reference may be correspondingly made to the implementation manners of the method embodiments of FIG. 5 to FIG. 9, and details are not described herein again.

It can be understood that the network device 22 in this embodiment of the present invention may be, for example, a base station, or a hardware structure in a base station, or another network device.

Figure 23:
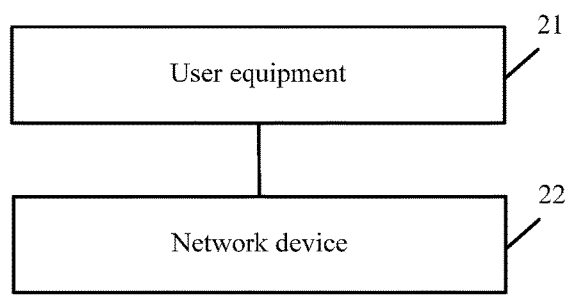
FIG. 23 is a schematic structural diagram of a user equipment scheduling system according to an embodiment of the present invention.

Correspondingly, an embodiment of the present invention further discloses a user equipment scheduling system. As shown in FIG. 23, the user equipment scheduling system of the present invention includes the user equipment 21 in the embodiment of FIG. 21 and the network device 22 in the embodiment of FIG. 22.

It can be understood that, functions of functional modules of the user equipment scheduling system in this embodiment may be specifically implemented according to the method in the method embodiment. For a specific implementation process of the functions, reference may be made to the related description of the method embodiment, and details are not described herein again.

To sum up, in implementation of the embodiments of the present invention, interference cancelation indication information is fed back to a network side, which resolves a problem of low efficiency of a scheduler on the network side because of CQI fluctuation in NAIC in the prior art, implements more efficient scheduling on UE by the network side, and makes full use of an interference cancelation gain.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. An interference cancelation feedback method, comprising:

decoding an interfering cell signal to obtain a decoding result;

generating a channel quality indicator (CQI) of a serving cell according to the decoding result and a received signal which comprises the serving cell signal and the interfering cell signal, wherein an interfering cell interferes with the serving cell of user equipment, and wherein the generating the CQI comprises determining whether to cancel a reconstructed signal of the interfering cell signal;

generating interference cancelation indication information, wherein the interference cancelation indication information indicates a situation of interference cancelation for the interfering cell performed on the received signal by the user equipment;

feeding back the CQI of the serving cell to a network side; and feeding back the interference cancelation indication information to the network side, wherein the interference cancelation indication information and the CQI of the serving cell are used by the network side to schedule the user equipment, wherein the interference cancelation indication information indicates:

that the user equipment has completed the interference cancelation on the received signal, that the user equipment does perform the interference cancelation on the received signal, or whether the decoding result is correct before the interference cancelation is performed, and wherein the generating the CQI further comprises:

when the decoding result is correct, canceling the reconstructed signal of the interfering cell signal from the received signal, and using a CQI generated after the interference cancelation as the CQI of the serving cell, wherein the interference cancelation indication information indicates that the user equipment has already completed the interference cancelation on the received signal.

2. The method according to claim 1, wherein the generating the CQI comprises:

when the decoding result is incorrect, skipping the operation of canceling the reconstructed signal of the interfering cell signal from the received signal, and using a CQI generated without performing the interference cancelation as the CQI of the serving cell, wherein the interference cancelation indication information indicates that the user equipment does not perform the interference cancelation on the received signal.

3. The method according to claim 1, wherein the interference cancellation indication information is one of interference cancellation acknowledgement (ACK) to indicate interference cancellation and interference cancellation negative acknowledgement (NACK) to indicate no interference cancellation.

4. An interference cancelation feedback apparatus, comprising:

a memory; and a processor coupled the memory and configured to:

decode an interfering cell signal to obtain a decoding result;

generate a channel quality indicator (CQI) of a serving cell according to the decoding result and a received signal which comprises the serving cell signal and the interfering cell signal, wherein an interfering cell interferes with the serving cell of user equipment, and wherein the generating the CQI comprises determining whether to cancel a reconstructed signal of the interfering cell signal;
generate interference cancelation indication information, wherein the interference cancelation indication information indicates a situation of interference cancelation for the interfering cell performed on the received signal by the user equipment;
feed back the CQI of the serving cell to a network side; and
feed back the interference cancelation indication information to the network side, wherein the interference cancelation indication information and the CQI of the serving cell are used by the network side to schedule the user equipment, wherein
the interference cancelation indication information indicates:
that the user equipment has completed the interference cancelation on the received signal,
that the user equipment does perform the interference cancelation on the received signal, or
whether the decoding result is correct before the interference cancelation is performed, and
wherein the generating the channel quality indicator CQI comprises:
canceling the reconstructed signal of the interfering cell signal from the received signal without regard to whether the decoding result is correct, and using a CQI generated after the interference cancelation as the CQI of the serving cell, wherein the interference cancelation indication information indicates whether the decoding result before the interference cancelation is performed is correct.

5. A user equipment scheduling method, comprising:
receiving interference cancelation indication information sent by user equipment, wherein the interference cancelation indication information indicates a situation of interference cancelation performed on a received signal by the user equipment, wherein the received signal of the user equipment comprises a serving cell signal and an interfering cell signal, wherein an interfering cell interferes with a serving cell of the user equipment;
receiving a channel quality indicator (CQI) of the serving cell sent by the user equipment; and
scheduling the user equipment according to the interference cancelation indication information and the CQI of the serving cell,
wherein the interference cancelation indication information used to indicate the situation of interference cancelation is based on whether a decoding result of the interfering cell signal is correct,
wherein the CQI of the serving cell was generated by determining whether to cancel a reconstructed signal of the interfering cell signal,
wherein the interference cancelation indication information indicates:
that the user equipment has completed the interference cancelation on the received signal,
that the user equipment does perform the interference cancelation on the received signal, or
whether the decoding result is correct before the interference cancelation is performed, and
wherein the generating the CQI further comprises:
when the decoding result is correct, canceling the reconstructed signal of the interfering cell signal from the received signal, and using a CQI generated after the interference cancelation as the CQI of the serving cell, wherein the interference cancelation indication information indicates that the user equipment has already completed the interference cancelation on the received signal.

6. The method according to claim 5, wherein the interference cancelation indication information indicates that the user equipment has already completed the interference cancelation on the received signal when the decoding result of the interference signal is correct, and the CQI of the serving cell is a CQI generated after the user equipment performs the interference cancelation on the received signal.

7. The method according to claim 6, wherein the interference cancelation indication information indicates that the user equipment does not perform the interference cancelation on the received signal when the decoding result of the interference signal is incorrect, and the CQI of the serving cell is a CQI generated without performing the interference cancelation.

8. The method according to claim 7, wherein the interference cancelation indication information used to indicate whether the decoding result of the interfering cell is correct is generated before the user equipment performs the interference cancelation, and wherein the CQI of the serving cell is a CQI that is generated after the user equipment performs the interfering cell cancelation on a CQI of the received signal.

9. The method according to claim 8, wherein the scheduling the user equipment according to the interference cancelation indication information and the CQI of the serving cell comprises:
collecting, according to the interference cancelation indication information, statistics on a probability of the CQI that is generated after the interfering cell cancelation and that is fed back by the user equipment;
performing, according to the probability obtained by statistics collection, weighted averaging on the CQI generated after the interfering cell cancelation and the CQI generated without performing the interfering cell cancelation; and
scheduling the user equipment by using a CQI generated after the weighted averaging.

10. The method according to claim 5, wherein the interference cancellation indication information is one of interference cancellation acknowledgement (ACK) to indicate interference cancellation and interference cancellation negative acknowledgement (NACK) to indicate no interference cancellation.

11. User equipment, comprising:
a memory; and
a processor coupled to the memory and configured to:
decode an interfering cell signal to obtain a decoding result;
generate a channel quality indicator (CQI) of a serving cell according to the decoding result and a received signal which comprises the serving cell signal and the interfering cell signal, wherein an interfering cell interferes with the serving cell of the user equipment, and wherein the generating the CQI comprises determining whether to cancel a reconstructed signal of the interfering cell signal;
generate interference cancelation indication information, wherein the interference cancelation indication information indicates a situation of interference cancelation for the interfering cell performed on the received signal by the equipment;
feed back the CQI of the serving cell to a network side; and feed back the interference cancelation indication information to the network side, wherein the interference cancelation indication information and the CQI of the serving cell are used by the network side to schedule the user equipment, wherein the interference cancelation indication information indicates:

that the user equipment has completed the interference cancelation on the received signal, that the user equipment does perform the interference cancelation on the received signal, or whether the decoding result is correct before the interference cancelation is performed, and wherein the generating, by the processor, of the CQI further comprises:

when the decoding result is correct, canceling the reconstructed signal of the interfering cell signal from the received signal, and using a CQI generated after the interference cancelation as the CQI of the serving cell, wherein the interference cancelation indication information indicates that the user equipment has already completed the interference cancelation on the received signal.

12. The user equipment according to claim 11, wherein the generating, by the processor, of the CQI further comprises:

when the decoding result is incorrect, skipping the operation of canceling the reconstructed signal of the interfering cell signal from the received signal, and using a CQI generated without performing the interference cancelation as the CQI of the serving cell, wherein the interference cancelation indication information indicates that the user equipment does not perform the interference cancelation on the received signal.

13. The user equipment according to claim 11, wherein the generating, by the processor, of the CQI further comprises:

canceling the reconstructed signal of the interfering cell signal from the received signal without regard to whether the decoding result is correct, and using a CQI generated after the interference cancelation as the CQI of the serving cell, wherein the interference cancelation indication information indicates whether the decoding result generated before the interference cancelation is performed is correct.

14. The user equipment according to claim 11, wherein the generating, by the processor, of the CQI further comprises:

canceling the reconstructed signal of the interfering cell signal from the received signal; and when the CQI generated after interfering cell cancelation is greater than a CQI generated without performing the interference cancelation, using the CQI generated after interfering cell cancelation as the CQI of the serving cell, wherein the interference cancelation indication information indicates that the user equipment has already completed interference cancelation on the received signal; or when the CQI generated after interfering cell cancelation is less than a CQI generated without performing the interference cancelation, using the CQI generated without performing the interference cancelation as the CQI of the serving cell, wherein the interference cancelation indication information indicates that the user equipment does not perform the interference cancelation on the received signal.

15. The user equipment according to claim 11, wherein the interference cancellation indication information is one of interference cancellation acknowledgement (ACK) to indicate interference cancellation and interference cancellation negative acknowledgement (NACK) to indicate no interference cancellation.

16. A network device, comprising:

a memory; and a processor coupled to the memory and configured to:

receive interference cancelation indication information sent by user equipment, wherein the interference cancelation indication information indicates a situation of interference cancelation performed on a received signal by the user equipment, wherein the received signal of the user equipment comprises a serving cell signal and an interfering cell signal, wherein an interfering cell interferes with a serving cell of the user equipment, and wherein the interference cancellation indication information is one of interference cancellation acknowledgement (ACK) to indicate interference cancellation and interference cancellation negative acknowledgement (NACK) to indicate no interference cancellation;

receive a channel quality indicator (CQI) of the serving cell sent by the user equipment; and schedule the user equipment according to the interference cancelation indication information and the CQI of the serving cell, wherein the interference cancelation indication information used to indicate the situation of interference cancelation is based on whether a decoding result of the interfering cell signal is correct, wherein the CQI of the serving cell was generated by determining whether to cancel a reconstructed signal of the interfering cell signal, and wherein the interference cancelation indication information indicates:

that the user equipment has completed the interference cancelation on the received signal, that the user equipment does perform the interference cancelation on the received signal, or whether the decoding result is correct before the interference cancelation is performed, and wherein the generating the CQI further comprises:

when the decoding result is correct, canceling the reconstructed signal of the interfering cell signal from the received signal, and using a CQI generated after the interference cancelation as the CQI of the serving cell, wherein the interference cancelation indication information indicates that the user equipment has already completed the interference cancelation on the received signal.

17. The network device according to claim 16, wherein the interference cancelation indication information indicates that the user equipment has already completed the interference cancelation on the received signal when the decoding result of the interference signal is correct, and the CQI of the serving cell is a CQI generated after the user equipment performs the interference cancelation on the received signal.

18. The network device according to claim 16, wherein the interference cancelation indication information indicates that the user equipment does not perform the interference cancelation on the received signal when the decoding result of the interference signal is incorrect, and the CQI of the serving cell is a CQI generated without performing the interference cancelation.

19. The network device according to claim 16, wherein the interference cancelation indication information, used to indicate whether the decoding result of the interfering cell is correct, is generated before the user equipment performs the interference cancelation, and wherein the CQI of the serving cell is a CQI that is generated after the user equipment performs interfering cell cancelation on a CQI of the received signal.

20. The network device according to claim 16, wherein the scheduling, by the processor, the user equipment according to the interference cancelation indication information and the CQI of the serving cell comprises:
    collecting, according to the interference cancelation indication information, statistics on a probability of the CQI that is generated after interfering cell cancelation and that is fed back by the user equipment; performing, according to the probability obtained by statistics collection, weighted averaging on the CQI generated after interfering cell cancelation and the CQI generated without performing interfering cell cancelation; and scheduling the user equipment by using a CQI generated after the weighted averaging.

21. The network device according to claim 16, wherein the interference cancellation indication information is one of interference cancellation acknowledgement (ACK) to indicate interference cancellation and interference cancellation negative acknowledgement (NACK) to indicate no interference cancellation.

* * * * *